(12) United States Patent
Van Houten et al.

(10) Patent No.: US 12,545,356 B2
(45) Date of Patent: Feb. 10, 2026

(54) MICROMOBILITY ELECTRIC VEHICLE WITH WALK-ASSIST MODE

(71) Applicant: Lyft, Inc., San Francisco, CA (US)

(72) Inventors: Lucas Jon Van Houten, San Francisco, CA (US); Gregoire Ludovic Vincent Vandenbussche, San Francisco, CA (US); Mark Phillip Holveck, Sunnyvale, CA (US)

(73) Assignee: Lyft, Inc., San Francisco, CA (US)

( * ) Notice: Subject to any disclaimer, the term of this patent is extended or adjusted under 35 U.S.C. 154(b) by 1257 days.

(21) Appl. No.: 16/579,530

(22) Filed: Sep. 23, 2019

(65) Prior Publication Data

US 2021/0086859 A1     Mar. 25, 2021

(51) Int. Cl.
*B62K 13/00* (2006.01)
*A61H 3/04* (2006.01)
(Continued)

(52) U.S. Cl.
CPC .............. *B62K 13/00* (2013.01); *A61H 3/04* (2013.01); *B60L 15/20* (2013.01); *B62K 11/00* (2013.01);
(Continued)

(58) Field of Classification Search
CPC ........ B62K 13/00; B62K 11/00; B62K 11/14; B62K 23/04; B62K 23/06; B62K 2202/00;
(Continued)

(56) References Cited

U.S. PATENT DOCUMENTS

| 4,895,044 | A | * | 1/1990 | Ekins | B62K 21/26 |
|---|---|---|---|---|---|
| | | | | | 74/551.9 |
| 5,730,243 | A | * | 3/1998 | Koike | G01R 31/3648 |
| | | | | | 180/170 |

(Continued)

FOREIGN PATENT DOCUMENTS

| CN | 205 440 663 | 8/2016 |
|---|---|---|
| TW | M 579 417 | 6/2019 |

(Continued)

OTHER PUBLICATIONS

U.S. Appl. No. 16/391,294, filed Apr. 22, 2019, Bromwich et al.
(Continued)

*Primary Examiner* — Adam R Mott
*Assistant Examiner* — Ricardo I Viscarra
(74) *Attorney, Agent, or Firm* — Baker Botts L.L.P.

(57) ABSTRACT

A micromobility electric vehicle with a controller that operates the vehicle in a walk-assist mode, expanding the population of users that can comfortably use the vehicle. In walk-assist mode, the speed of the vehicle may be limited to a walking speed, regardless of the position of a throttle. In contrast, in a riding mode, the maximum speed may be higher. The walk-assist mode may be entered or exited based on output of one or more sensors, indicating that the user is or is not riding the vehicle or that a user is or is not pushing the vehicle. Such sensors may be positioned in a seat, in a floorboard or on the handlebars of the vehicle. Alternatively or additionally, the sensor may be associated with a control, such as a tab configured to be pressed by a user's thumb when the user is pushing the vehicle.

19 Claims, 11 Drawing Sheets

(51) Int. Cl.
*B60L 15/20* (2006.01)
*B62K 11/00* (2006.01)
*B62K 11/14* (2006.01)
*B62K 23/04* (2006.01)
*B62K 23/06* (2006.01)

(52) U.S. Cl.
CPC .............. *B62K 11/14* (2013.01); *B62K 23/04* (2013.01); *B62K 23/06* (2013.01); *A61H 2003/043* (2013.01); *A61H 2003/046* (2013.01); *A61H 2201/1207* (2013.01); *A61H 2201/5035* (2013.01); *B60L 2200/24* (2013.01); *B62K 2202/00* (2013.01)

(58) Field of Classification Search
CPC ................ A61H 3/04; A61H 2003/043; A61H 2003/046; A61H 2201/1207; A61H 2201/5035; B60L 15/20; B60L 2200/24
See application file for complete search history.

(56) References Cited

U.S. PATENT DOCUMENTS

| | | | |
|---|---|---|---|
| 7,898,439 B2 | 3/2011 | Bettez et al. | |
| 8,954,212 B2* | 2/2015 | Hatanaka | B60L 15/2063 74/491 |
| 8,957,618 B2* | 2/2015 | Tadano | B60L 58/26 318/446 |
| 9,076,136 B2 | 7/2015 | Bettez et al. | |
| 9,269,236 B2 | 2/2016 | Bettez et al. | |
| 9,598,128 B2 | 3/2017 | Assénat et al. | |
| 9,604,696 B2* | 3/2017 | Miyoshi | B62M 6/45 |
| 10,227,102 B1* | 3/2019 | Ballou | B62J 3/14 |
| 10,456,658 B1* | 10/2019 | Doerksen | G01C 19/42 |
| 2004/0064868 A1* | 4/2004 | Williams | A63B 60/12 2/16 |
| 2005/0177285 A1* | 8/2005 | Honda | B62M 7/12 180/220 |
| 2007/0199810 A1* | 8/2007 | Ieda | B62M 25/08 200/61.88 |
| 2009/0240575 A1 | 9/2009 | Bettez et al. | |
| 2009/0242284 A1* | 10/2009 | Whetstone, Jr. | B62D 51/04 180/19.2 |
| 2010/0228405 A1 | 9/2010 | Morgal et al. | |
| 2011/0161141 A1 | 6/2011 | Bettez et al. | |
| 2012/0187881 A1* | 7/2012 | Tadano | B62J 43/20 318/446 |
| 2014/0216837 A1* | 8/2014 | Hsu | B62M 6/40 180/181 |
| 2014/0277888 A1* | 9/2014 | Dastoor | B60L 58/22 701/22 |
| 2015/0066277 A1* | 3/2015 | Kojina | A61H 3/04 180/19.1 |
| 2015/0112478 A1 | 4/2015 | Bettez et al. | |
| 2015/0152668 A1 | 6/2015 | Assénat et al. | |
| 2015/0367750 A1* | 12/2015 | Takamoto | B62K 11/00 701/22 |
| 2016/0016638 A1* | 1/2016 | Miyoshi | B62M 6/45 701/22 |
| 2016/0297499 A1* | 10/2016 | Ohashi | B62M 6/45 |
| 2017/0036722 A1 | 2/2017 | Assénat et al. | |
| 2017/0183056 A1* | 6/2017 | Yamamoto | F16H 63/50 |
| 2017/0355412 A1* | 12/2017 | Takeshita | B62J 11/00 |
| 2018/0086417 A1* | 3/2018 | Baumgaertner | B62M 6/55 |
| 2018/0319368 A1 | 11/2018 | Keating et al. | |
| 2018/0345970 A1* | 12/2018 | Takayanagi | B60W 10/02 |
| 2018/0362115 A1* | 12/2018 | Tsuchizawa | B62M 6/50 |
| 2019/0075726 A1* | 3/2019 | White | A01D 34/824 |
| 2019/0127002 A1 | 5/2019 | Bettez et al. | |
| 2019/0206009 A1 | 7/2019 | Gibson et al. | |
| 2019/0248439 A1* | 8/2019 | Wang | B62K 11/10 |
| 2020/0094693 A1* | 3/2020 | Caro Suarez | B60L 15/20 |
| 2021/0086859 A1* | 3/2021 | Van Houten | B62K 11/00 |
| 2022/0227446 A1* | 7/2022 | Brown | B62K 3/002 |
| 2024/0408972 A1* | 12/2024 | Fukuoka | B62M 6/45 |

FOREIGN PATENT DOCUMENTS

| | | |
|---|---|---|
| WO | WO 2014/154295 | 10/2014 |
| WO | WO 2018/056819 | 3/2018 |

OTHER PUBLICATIONS

U.S. Appl. No. 16/448,660, filed Jun. 21, 2019, Lambert et al.
U.S. Appl. No. 16/578,995, filed Sep. 23, 2019, Vandenbussche et al.
U.S. Appl. No. 16/579,556, filed Sep. 23, 2019, Van Houten et al.
U.S. Appl. No. 16/579,627, filed Sep. 23, 2019, Vandenbussche et al.
U.S. Appl. No. 29/706,673, filed Sep. 23, 2019, Van Houten et al.
U.S. Appl. No. 29/706,676, filed Sep. 23, 2019, Van Houten et al.
U.S. Appl. No. 29/706,678, filed Sep. 23, 2019, Van Houten et al.
U.S. Appl. No. 29/706,682, filed Sep. 23, 2019, Van Houten et al.
[No Author Listed], And then there was Two. Bird Two. Bird Rides, Inc. 2019. 8 pages URL:https://two.bird.co [last accessed Sep. 26, 2019].
International Search Report and Written Opinion, PCT/US2020/051665 dated Nov. 17, 2020, 17 pages.
International Search Report and Written Opinion, PCT/US2020/051666 dated Nov. 19, 2020, 17 pages.

* cited by examiner

MICROMOBILITY ELECTRIC VEHICLE WITH WALK-ASSIST MODE

BACKGROUND

Conventional transportation options in urban environments include public transportation (e.g., subways, busses), large vehicles such as cars (e.g., personal vehicles, taxis, ride-share services), bicycles, and walking. More recently, so-called "micromobility" shareable/rentable vehicles such as docked and dockless scooters and bicycles have become more common, improving access and allowing users additional options for traveling more quickly over shorter distances than walking typically allows.

SUMMARY

Having a variety of different transportation options improves users' lives by increasing mobility and enabling users to select the transportation option that works best for them on any given trip. For users desiring to travel relatively short distances (e.g., less than 5 miles), micromobility transportation options provide convenient and environmentally-friendly alternatives to car-based travel. Micromobility transportation options include human-powered vehicles (e.g., bicycles, scooters) and vehicles with electric motors (e.g., electric bicycles, electric scooters), all of which are designed to be used primarily within the traditional bicycle lane infrastructure.

Within the micromobility transportation category, different transportation options may be more suitable for certain types of trips than others. For example, while a stand-up scooter may work well for short distances, a vehicle that allows the user to be seated (e.g., a bicycle) may work better for longer distances. Micromobility vehicles with electric motors such as electric bicycles and electric scooters prevent rider fatigue and assist with navigating hilly terrain. Additionally, the purpose of each trip may dictate which type of transportation option a user selects. For example, a daily commuter carrying nothing or only a small bag may select a transportation option that emphasizes speed over stability, whereas a user traveling to a store to pick up a package or groceries may select a transportation option emphasizing package storage and security rather than speed.

Conventional micromobility transportation options are not well suited for moderate distance (e.g., 2-5 mile) trips, which are among the most common trips in an urban environment. For example, riding a bicycle or standing on a scooter and engaging a thumb accelerator for more than 1-2 miles may become tiresome for a user, and may result in the user not selecting those transportation options for such a trip. To this end, some embodiments are directed to an electric vehicle designed to accommodate such moderate distance trips across a variety of terrains to enhance the user's experience, comfort, and enjoyment while riding the vehicle.

In some embodiments, a micromobility electric vehicle may comprise a throttle configured to be moved into a range of throttle positions, a sensor, and a controller operatively coupled to receive inputs from the throttle and the sensor and to provide a motor control signal to a motor. The controller may be configured to generate the motor control signal based on inputs received from the throttle and the sensor. The controller may be configured to operate in a riding mode and a walk-assist mode selectively, based on an input received from the sensor. In the walk-assist mode, the controller may be configured to provide a motor control signal to provide a lower speed than in the riding mode for at least a portion of the range of throttle positions.

In some embodiments, a micromobility electric vehicle may comprise handle bars, a motor, and a throttle mounted to the handle bars. The throttle may be configured to be moved into a range of throttle positions and may comprise a tubular portion around the handlebar and a tab, coupled to the tubular portion, extending radially outward from the tubular portion. A controller may be operatively coupled to receive an input from the throttle and configured to generate a control signal to the motor such that the motor propels the electric vehicle at a maximum speed greater than 10 miles per hour when the tubular portion is rotated by a user riding on the vehicle and propels the electric vehicle at a maximum speed limited to less than 5 miles per hour when the tab is pressed by a user pushing the vehicle.

In some embodiments, a method of operating a micromobility electric vehicle may comprise sensing whether a user is mounted on the electric vehicle, sensing activation of a throttle, and controlling a speed of the electric vehicle based on activation of the throttle such that, when a user is not sensed mounted on the electric vehicle, the speed is limited to walking speed and, when a user is sensed mounted on the electric vehicle, the speed is a riding speed based on a position of the throttle.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

DETAILED DESCRIPTION

Figure 1A:
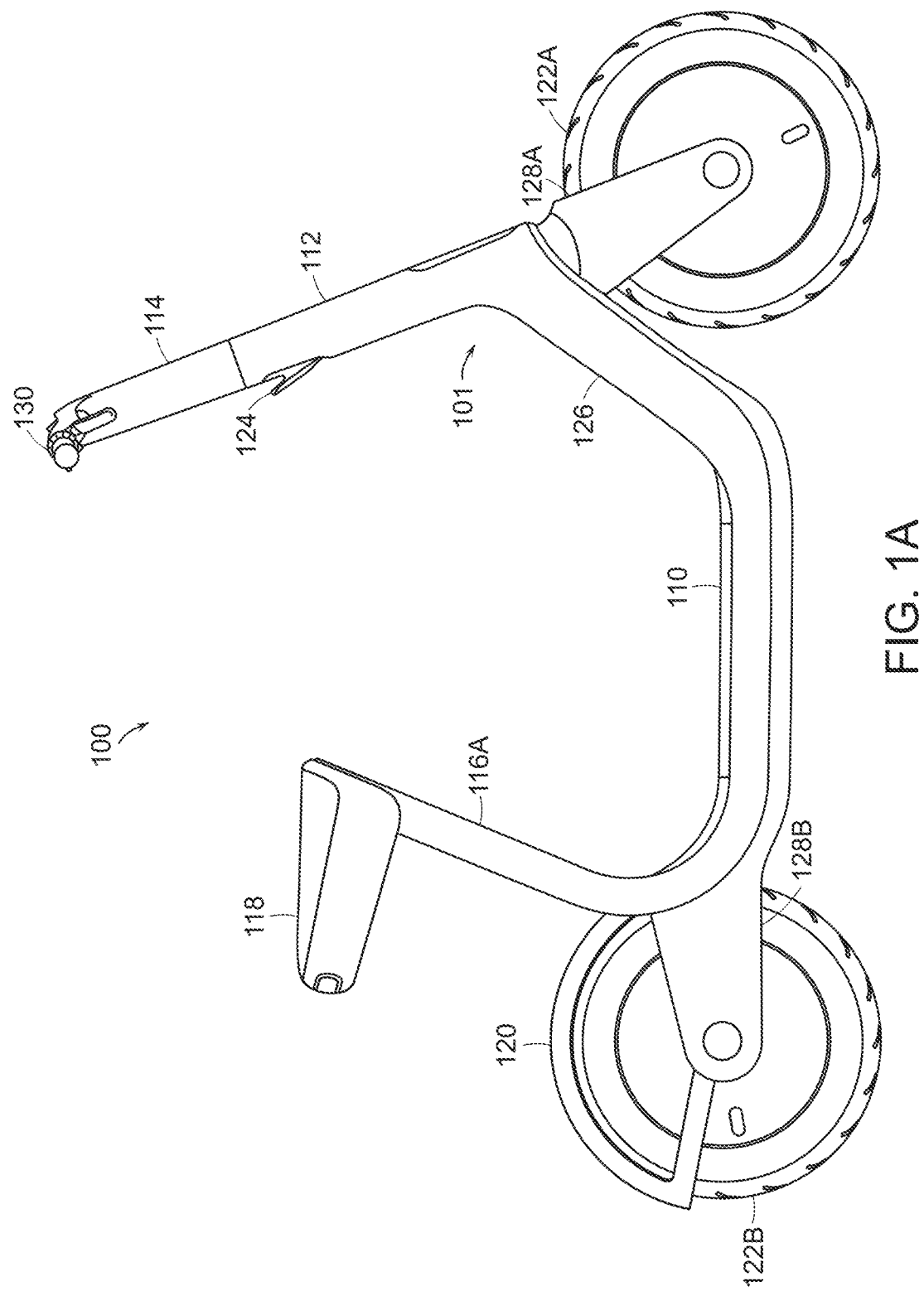
FIG. 1A illustrates a first side view of an electric vehicle in accordance with some embodiments.
Figure 1B:
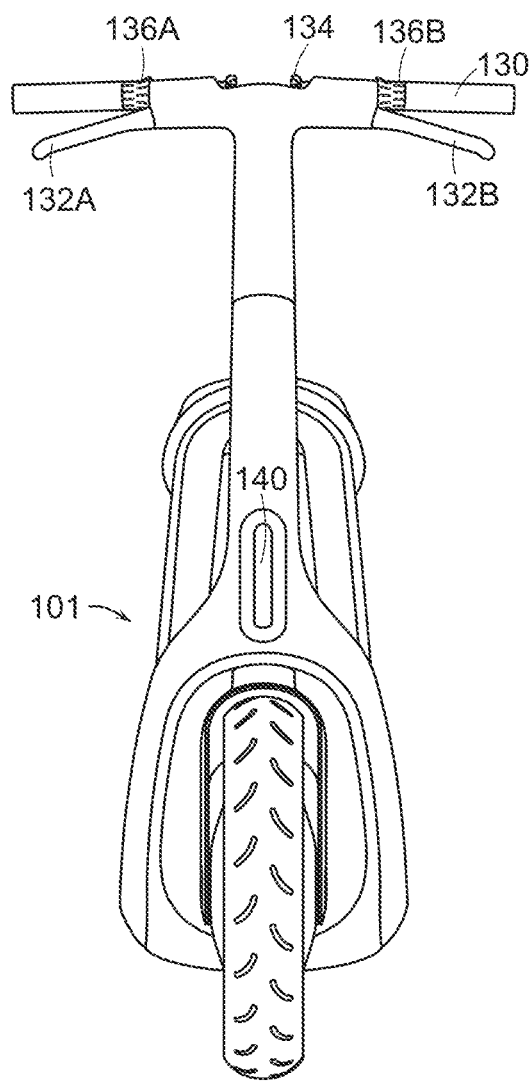
FIG. 1B illustrates a right side view of the electric vehicle of FIG. 1A.
Figure 1C:
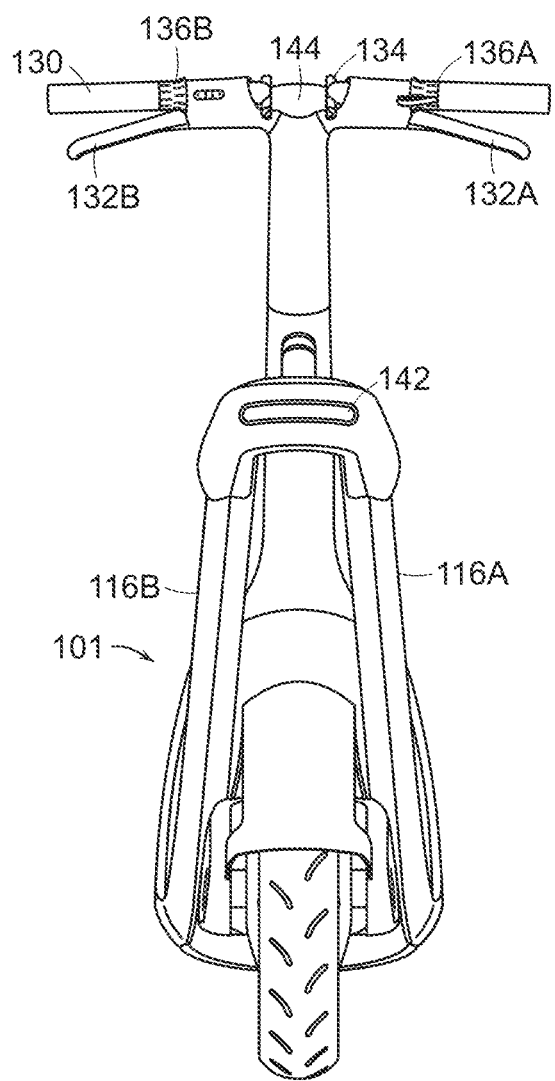
FIG. 1C illustrates a rear view of the electric vehicle of FIG. 1A.
Figure 1D:
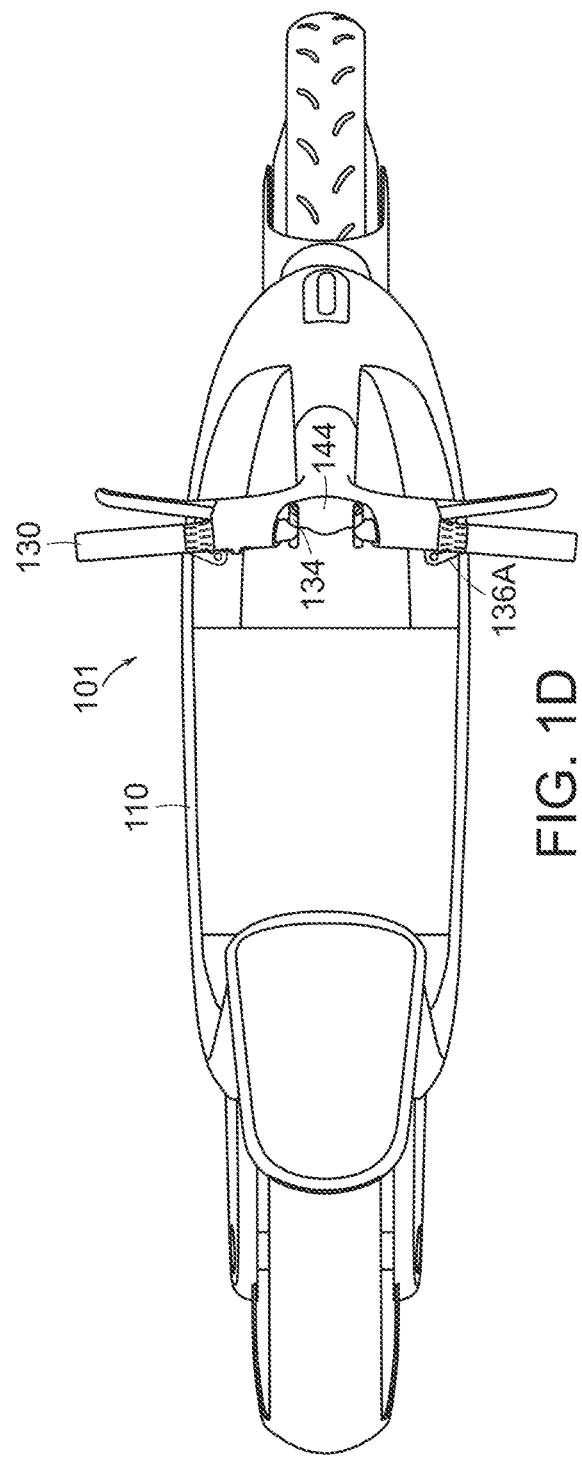
FIG. 1D illustrates a top view of the electric vehicle of FIG. 1A.
Figure 1E:
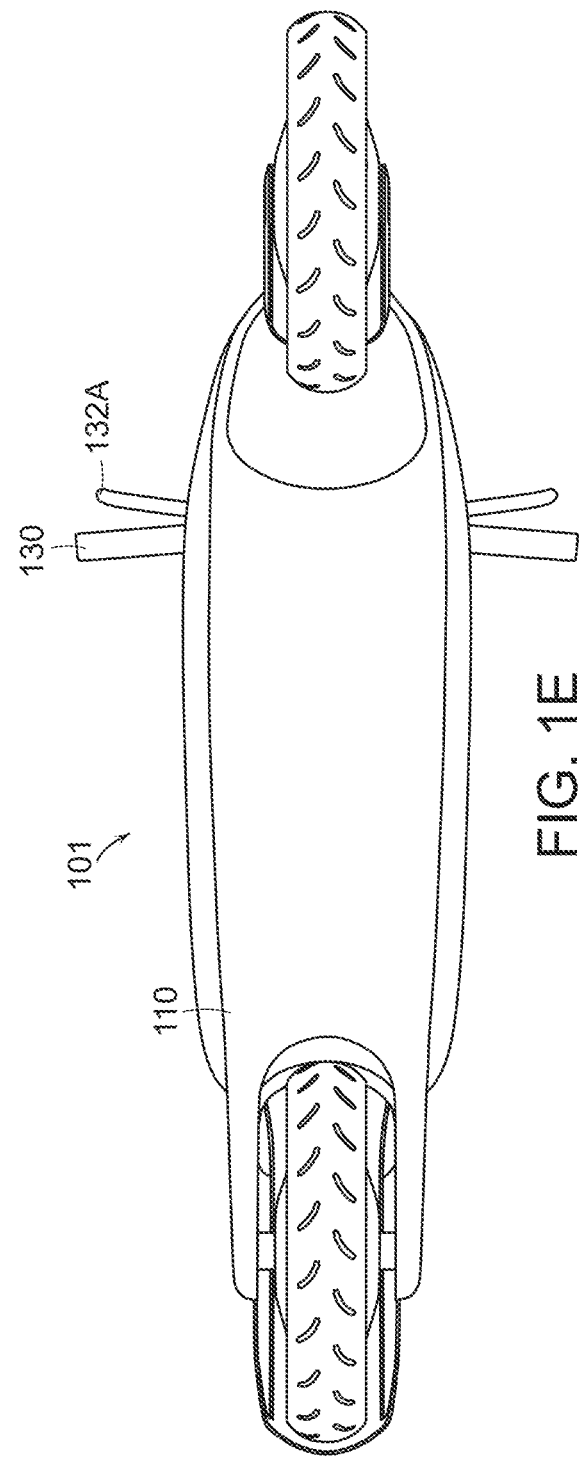
FIG. 1E illustrates a bottom view of the electric vehicle of FIG. 1A.

An on-demand, multimodal transportation system may enable any of a number of users who do not have or do not want to use personal vehicles to quickly and economically travel from an origin to a destination. The system make receive as inputs from a user the origin and destination for a trip and determine modes of transportation along one or more segments of a route from the origin to the destination. For segments to be traversed in a vehicle, that system may further dynamically match the user with a shared vehicle available to transport the user over the segment. For other segments, the system may suggest public transportation options or that the user walk.

For example, a multimodal, dynamic matching system may determine that the most efficient route from an origin to a destination entails riding in a shared car to a commuter train station, riding a commuter train to a city where the user can then access a shared vehicle designed for personal transportation. The personal transportation vehicle may be a bicycle or a scooter. The system may select between a bicycle and a scooter for example, based on factors such as vehicle availability or length of trip, with a bicycle being suggested for longer trips than a scooter. An electric scooter, for example, may be suggested for micromobility, such as when a segment of the trip is less than 5 miles, for example.

As discussed briefly above, most conventional micromobility transportation options are designed for short distance (e.g., 0-2 mile) trips, and are less comfortable for the user when used for moderate distance (e.g., 2-5 mile) trips. Some embodiments are directed to a micromobility electric vehicle and one or more features thereof that provide a safe, reliable, and approachable user experience for moderate distance trips. These electric vehicles may be accessible as part of a shared vehicle model in which riders do not have a personal vehicle, but instead interact with a dynamic matching system to access, under a rental or subscription model, any of numerous such electric vehicles deployed throughout a region, such as a city.

The inventors have recognized and appreciated that the usability of a micromobility electric vehicle may be increased by providing a walk-assist mode. In the walk-assist mode, the speed of the vehicle may be limited such that a user may use the power of the motor, in whole or in part, to propel the vehicle without concern that the vehicle will move so quickly that the user loses control of the vehicle. With assistance from the motor moving the vehicle, the effort exerted by the user to move the vehicle is correspondingly decreased.

With a walk-assist mode, a user, who may be using the vehicle for a trip or may be a maintenance worker servicing vehicles that are available as part of a vehicle sharing system, can readily push the vehicle up an incline or over a curb, or use the vehicle in other scenarios in which pushing the vehicle is desired but might be difficult. With such a capability, the vehicle may become accessible for a wide population of users, including users who might lack physical strength to otherwise push the vehicle. As an example of how walk-assist mode might be used for maintenance, in walk-assist mode, a rear wheel of the electric vehicle might be configured to position the electric vehicle in an upright storage position such that the rear wheel makes contact with a ground surface and a front wheel of the electric vehicle lifts off the ground surface. Alternatively or additionally, walk-assist mode might be used to slowly propel the front wheel up a ramp or other inclined surface to put the vehicle in a partially or fully vertical position. As an example of how walk-assist mode might be used for a trip, an on-demand, multimodal transportation system may suggest a trip segment over a sidewalk that is unsuited for riding a scooter, and the user might be instructed to use walk-assist mode to walk, with the vehicle, over that segment.

In a walk-assist mode, a controller on the vehicle may limit the speed of the vehicle to a walking speed, which may, for example, be less than 5 miles per hour, or less than 4 miles per hour in some embodiments, or between 2 and 5 miles per hour in other embodiments. The limit on speed of the vehicle may be based on measurements with a speed sensor. Alternatively or additionally, the speed may be limited indirectly to a speed at which a user can move while pushing the vehicle. In some embodiments, such a limit may be imposed by a controller receiving input from a force sensor on the handlebars or other portion of the vehicle where a user might push on the vehicle while walking beside it. As a specific example, the controller may increase torque delivered by the motor propelling the vehicle when a force above an upper threshold is sensed, indicating a user exerting more than a desired level of effort to push the vehicle. The controller may decrease torque delivered by the motor propelling the vehicle when a force below a lower threshold is sensed. The upper and lower thresholds may both be low, close to zero, such that the user may perceive that the vehicle is easy to push, and is nearly weightless.

In contrast, in a riding mode, the speed of the vehicle may be limited to a suitable riding speed, which may be more than 10 miles per hour, or more than 20 miles per hour, such as 30 miles per hour or 40 miles per hour, for example. In some embodiments, the limit may be set to provide a predetermined maximum speed between 15 and 40 miles per hour. However, it should be appreciated that, in some embodiments, the speed may not be affirmatively limited in the riding mode and the top speed in riding mode may be determined based on the size of the motor, weight of the rider, grade of the road on which the vehicle is driving and/or other factors.

In some embodiments, the vehicle may selectively enter walk-assist mode automatically based on the output of a sensor. That sensor may provide an indication that a user is, or is not, mounted on the vehicle. Such a sensor, for example, may be a pressure sensor in a seat or floor board of the vehicle. Alternatively or additionally, the presence of a rider on the vehicle may be sensed by measuring tire pressure. For example, the tire pressure may be monitored and a sudden change may be an indication of a user mounting or dismounting the vehicle.

Alternatively or additionally, a separate control mechanism may be provided to enable a user to place the vehicle in walk-assist mode. As a specific example, a tab may be mounted to a handlebar of the vehicle. The tab may be separate from a throttle used to regulate speed in riding mode and, when activated, may place the vehicle in walk-assist mode, with a speed, though limited to a walking speed, proportional to the amount of movement of the tab.

In other embodiments, the vehicle may have a throttle that is active in both riding mode and walk-assist mode. In such an embodiment, a controller, receiving as an input an indication of the position of the throttle, may regulate speed using different control algorithms such that the maximum speed within walk-assist mode is slower than the maximum speed during riding mode. In some embodiments, the speed may be slower in the walk-assist mode than in riding mode. As a specific example, the throttle may be moveable into any of a range of throttle positions. At the end of that range, corresponding to full throttle, the controller may control the motor to send control signals to a motor to deliver a maximum speed for the operating mode, which may be different for different modes. At throttle positions elsewhere within the range, the controller may be configured to send motor control signals that deliver speeds that are a fraction of the maximum speed for the operating mode, with the fraction being proportional to the position of the throttle within the range. Such control may be provided by a controller that receives as input values from one or more sensors, which may be a sensor indicating presence or absence of a rider, and/or a speed sensor. An illustrative electric vehicle in which these multiple modes of operation is illustrated in FIGS. 1A-1E and FIG. 2.

FIGS. 1A-E illustrate a side view, a front view, a rear view, a top view, and a bottom view, respectively, of an electric vehicle 100 in accordance with some embodiments. In the illustrated embodiment, electric vehicle 100 is a two-wheeled vehicle with a front wheel 122A and a rear wheel 122B mounted on axles supported by fork 128A or 128B, respectively. Either or both of wheels 122A and 122B may be driven by an electric motor, which may have a stator mounted to one of the forks and a rotor coupled to the axle.

Batteries and control electronics may be mounted on board electric vehicle 100. In some embodiments, batteries and associated controllers may be mounted within a compartment coupled to a frame 101 of electric vehicle 100. For example, electric vehicle 100 includes a footboard 110. Footboard 110 may have upper and lower surfaces that are separated to create a compartment in which a battery and motor controller may be installed. The compartment may have one or more security features. For example, batteries may be removable, but may be locked in the compartment unless released by a key or special tool. Footboard 110 may have a bottom (e.g., flat) portion 111 arranged between the front wheel 122A and the rear wheel 122B and an angled portion 126. In some embodiments, the bottom portion 111 may be horizontal (e.g., parallel to a ground surface). However, in other embodiments, the bottom portion 111 may be inclined relative to a ground surface. For example, the bottom portion may be inclined relative to a ground surface if the front wheel 122A and rear wheel 122B are different sizes. The angled portion 126 may be configured to accommodate storage and operate, at least in part, as a fender for the front wheel 122A so that a separate fender (e.g., fender 120 shown covering a portion of the rear wheel 122B) may not be required for the front wheel 122A.

Electric vehicle 100 includes a column 112 coupled to the angled portion 126 of the footboard 110 and a stem 114 rotatably coupled to the column 112. Stem 114 may have handlebars 130 at one end and may be attached at the other end to front fork 128A such that rotation of the handlebars 130 turns the fork 128A and front wheel 122A with it. Column 112 may include a channel to allow cabling (e.g., for brakes, a throttle, electronics, etc.) to be placed internal to the column.

Electric vehicle 100 also includes seat 118, which is coupled to footboard 110 by seat posts 116A and 116B. In some embodiments, footboard 110, column 112, and seat posts 116A and 116B may form a continuous frame 101 that is not adjustable. For example, the frame may be formed of one continuous piece of material and/or may include multiple pieces of material that are welded, bolted or otherwise rigidly attached to prevent adjustment of the pieces relative to each other.

In some embodiments, the frame members may be tubular, with varying cross section. The cross section of the various frame members may be established based on functional as well as aesthetic considerations. For example, a portion of the frame adjacent to the angled portion 126 of the footboard may have a cross section that is elongated in a direction perpendicular to a surface on which wheels 122A, 122B rest. Such a configuration may provide a rim around portions of the footboard, creating a space along the angled portion 126 of the footboard for storage of items, and providing a finished and aesthetically pleasing appearance for electric vehicle 100, without separate body panels. Further, the rim may provide visual clues to riders how electric vehicle 100 can be used even when the rider needs to transport parcels, making the vehicle approachable.

Other features alternatively or additionally may be included on electric vehicle 100 to make the vehicle desirable for use on moderate distance trips. In some embodiments, column 112 may include a hook 124 configured to enable a loop, strap, or other portion of a personal item (e.g., a bag, backpack, package) to be secured to the vehicle. Collectively, the hook 124 and the angled portion 126 of the footboard may provide a storage area on the vehicle. Hook 124 may be adjustable such that it forms an angle relative to column 112 only when in use (e.g., when a bag is attached thereto) and retracts into column 112 when not in use.

As a further example of features that make electric vehicle 100 desirable for use on moderate distance trips, multiple user interface elements may be mounted to the upper end of stem 114, facing a user riding the vehicle. In the illustrated embodiment, stem 114 has attached thereto handlebars 130 configured to steer the vehicle when in use by rotating the stem 114 relative to the column 112. Brake levers 132A and 132B are arranged proximate to handlebars 130 and are coupled to braking components located near the wheels 122A and/or 122B by brake cables located, for example, within column 112. Handlebars 130 also include throttle 136A and 136B configured to provide acceleration to the electric vehicle when engaged, for example, by rotating the throttle around an axis along the length of the handlebars 130. Although throttle 136A and 136B is shown as a rotatable component, in some embodiments, throttle 136A and 136B may additionally or alternatively include components that allow for control of the throttle without requiring rotation. For example, throttle 136A and/or 136B may include one or more thumb-based controls that enable manipulation of the throttle without requiring rotation. Additionally, throttle 136A and 136B may be arranged on both right and left handlebars 130 as shown, or alternatively, the throttle may be arranged on only one side of the handlebars 130 (e.g., only throttle 136A arranged on the right side handlebar may be present without a corresponding throttle 136B on the left side handlebar).

In some embodiments, handlebars 130 also include electronic device holder 134 configured to grasp a portable electronic device, such as a smartphone. In some embodiments, electronic device holder 134 comprises spring-loaded arms that retract, at least in part, into the handlebars 130 such that, when a portable electronic device is arranged between the spring-loaded arms, the electronic device holder 134 grips the device using forces (e.g., spring-based forces) applied by the spring-loaded arms against the edges of the device in the holder. While the electronic device holder 134 shown in FIGS. 1A-E are configured as horizontally positioned arms, in other embodiments they may be vertically oriented. In some embodiments, the orientation of electronic device holder 134 may be configurable, for example, by rotating the electronic device holder. A smartphone may thus be held such that its display is visible to the user of the electric vehicle 100 or such that sound output by its speakers is audible to the user.

A smartphone or other mobile device may be wirelessly coupled to control electronics of the electric vehicle 100, either through short range wireless communication (e.g., near field communication, Bluetooth, etc.) with control electronics on the vehicle or through connection over a wide area network to a server exchanging information with control electronics on the vehicle. With such wireless coupling, the smartphone may provide a robust interface through which the user may provide or receive commands or information about the state of a vehicle during a trip. Further, the smartphone may have access to a cellular data network, GPS sensors and other sources of information, which can enable the user interface to display navigation or other information other than about the vehicle state per se that might be useful for a user. Such interfaces may be controlled by an app on the smartphone, enabling robust interfaces, which may be intuitive for a user to access and configure and/or can be provided along with guidance on configuring and accessing those user interfaces. In embodiments in which the electric vehicle is part of a vehicle sharing system in which vehicles are rented by users via a smartphone app, the app through which a user arranges for rental of a specific vehicle may control display of user interfaces associated with that vehicle, further making the vehicle accessible to users.

In some embodiments, a top surface of the stem 114 includes a display 144 arranged between the spring-loaded arms of the electronic device holder 134. The display 144 may be configured to display information about the electric vehicle. For example, display 144 may be configured to show a battery charge state of the vehicle, a predicted remaining range of the vehicle, maintenance information (e.g., tire pressure) related to the vehicle, a length of time that the vehicle has been operated, current charges associated with the operation of the vehicle when the vehicle is a shared vehicle, or any other suitable information. Display 144 may also be configured to show other information unrelated to the vehicle, but that the user may find useful during operation of the vehicle, such as time information and map or navigation information. When a portable electronic device (e.g., a smartphone) is secured by electronic device holder 134, display 144 may not be visible to the user due to the relative arrangement of electronic device secured by the electronic device holder 134 and the display 144. In such an instance, the display of the electronic device may present the same, different, or additional information that the display 144 is configured to present. In some embodiments, the display of the electronic device may be configured to present, e.g., via an app on the device, additional information to provide an enhanced user experience during operation of the vehicle. Additionally, the display 144 may be turned off or dimmed when an electronic device is secured in electronic device holder 134 to save power.

Electric vehicle 100 further includes lights 140 and 142 arranged on the front and rear of the vehicle. Front light 140 may be configured, at least in part, as a headlight for providing illumination of the roadway and to signal the presence of the vehicle to oncoming vehicular and non-vehicular traffic. Rear light 142 may be configured, at least in part, as a brake light to indicate to others behind the vehicle when the user of the vehicle has applied the brakes. Rear light 142 may also include one or more indicators for turn signals when the electric vehicle is configured to use turn signal indicators. In some embodiments, lights 140 and 142 are configured to display information about the vehicle, for example, when the user approaches the vehicle and/or starts the vehicle. For example, one or both of the lights may turn on and/or flash in a predetermined sequence upon starting the vehicle. Additionally, although shown as single lights 140 and 142 located on the front and rear of the vehicle respectively, it should be appreciated that each light assembly may include multiple lights having different characteristics (e.g., colors) and may be controlled independently or together.

Figure 2:
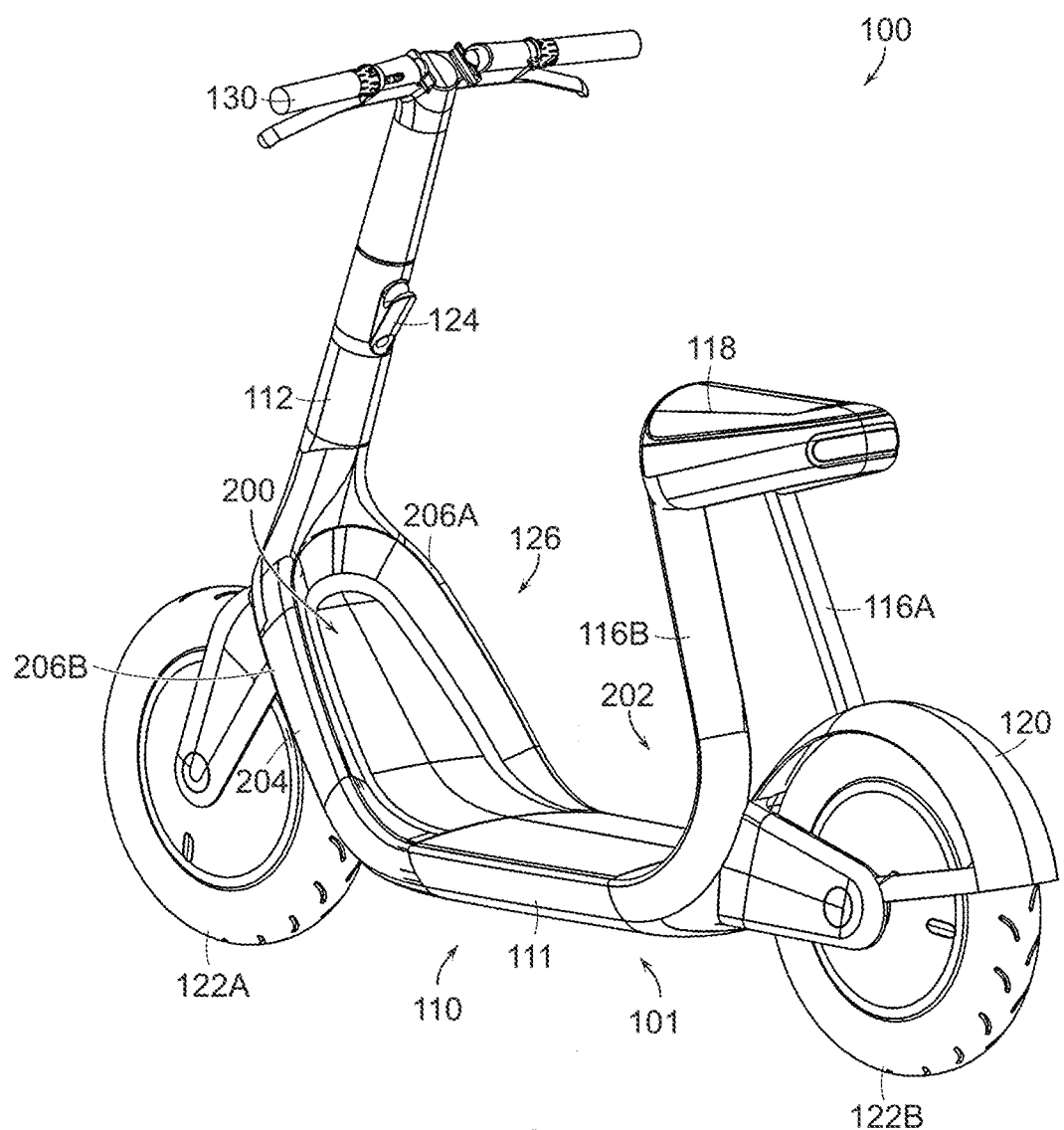
FIG. 2 illustrates a rear perspective view of the electric vehicle of FIG. 1A.

FIG. 2 illustrates a rear perspective view of the electric vehicle 100 of FIG. 1A showing a front storage volume 200. As shown in FIG. 2 and noted previously, the vehicle includes a footboard 110 having a bottom portion 111 that extends between a front wheel 122A and a rear wheel 122B. The vehicle also includes an angled frame portion 204 which extends from the bottom portion of the footboard substantially parallel to an angled footboard portion 126. The angled footboard portion 126 is disposed below a top edge of the angled frame portion 204, such that the angled footboard portion 126 is recessed relative to the angled frame portion 204. Alternatively, the angled frame portion 204 may be conceptualized as forming a rim around the angled footboard portion 126, as shown. In particular, a right frame portion 206A and a left frame portion 206B provide a raised rim or lip on the edges of the angled footboard portion 126 to help secure an object within the front storage volume 200 (e.g., to prevent sliding of the object laterally off the angled portion of the footboard 126. Both the angled footboard portion 126 and the angled frame portion 204 extend forward and upward relative to the bottom portion 111 of the footboard 110. A column 112 extends upwards and rearwards from the angled frame portion 204 away from the front wheel 122A toward the handlebars 130. According to the embodiment of FIG. 2, the front storage volume is defined on two sides by the angled footboard portion 126 and the column 112.

According to the embodiment of FIG. 2, the vehicle 100 includes a front hook 124 which is disposed on the column 112 and is configured to receive and support a strap of an object placed in the front storage volume 200. For example, the hook 124 may receive a fabric strap of a tote bag or shoulder bag. As another example, the hook 124 may receive a plastic or paper strap of a shopping bag. The hook may alternatively receive and retain any suitable portion of an object in the front storage volume. In some embodiments, the hook may be biased to retract into the column 112 when not in use. For example, a torsion spring may urge the hook into a recess formed in the column when an object is not retained by the hook.

As shown in FIG. 2, the vehicle 100 may also include a rear storage volume 202 disposed at a rearmost portion of the footboard 110.

Such a vehicle may be propelled by an electric motor. In some embodiments, the motor may be a direct drive motor, coupled to one of the wheels. The torque generated by the motor may be set by a controller. The controller may be a microprocessor, microcontroller, field programmable device, or other electronic device that may be programmed or otherwise configured to execute a control algorithm as described herein.

The controller may receive inputs from a throttle and one or more sensors. The sensors, for example, may include a speed sensor. An example of a suitable speed sensor is a sensor coupled to a wheel of the electric vehicle so as to measure a rate of rotation, which may then be related to a speed. Alternatively or additionally, a speed sensor may be electronic, receiving position information from a GPS system and computing speed based on rate of change of position.

A rider sensor may also provide input to the controller. A rider sensor may provide an indication of whether a rider is mounted on the electric vehicle and/or that a rider is not mounted on the electric vehicle. As an example of a suitable rider sensor, one or more pressure sensors may be installed in a location on the electric vehicle against which a rider mounted on the vehicle is likely to exert pressure. A pressure sensor, for example, may be installed in the seat of the electric vehicle or in the footboard of the electric vehicle. In this case, a force reading above a threshold may indicate a rider mounted on the vehicle. Alternatively or additionally, a pressure sensor may be mounted on the handlebars of the vehicle. In this case, a force reading above a threshold may indicate a user pushing the vehicle and therefore not mounted on the vehicle. Further, the presence or absence of a rider may be inferred from the output of sensors serving other functions than indicating the presence of a rider. As an example, sensors positioned to measure air pressure within the tires may indicate the presence of a rider, as the air pressure may increase when a rider mounts the vehicle.

Regardless of the number and type of sensors, the controller may use inputs derived from these sensors, in combination with an indication of motion of a throttle, to generate motor control signals. In some embodiments, the motor control signal will impact the torque applied by a motor on one or more wheels of the vehicle, so as to propel the vehicle.

Figure 3:
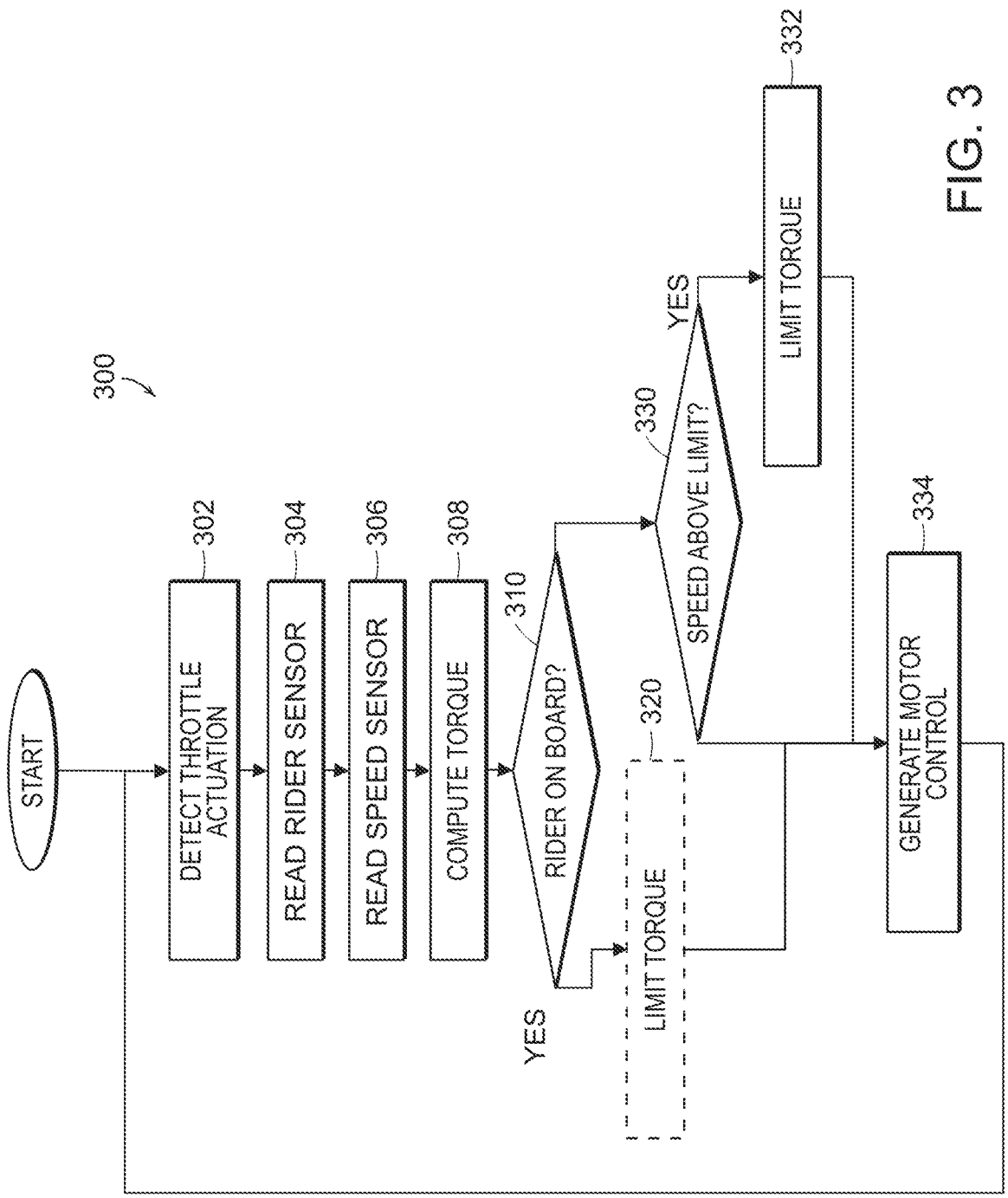
FIG. 3 is a flowchart of a method of operating a controller for an electric vehicle, in accordance with some illustrative embodiments.

FIG. 3 illustrates a method 300 that may be implemented by the controller. In this example, method 300 may start when the vehicle is turned on or placed in an operating state in which motion of the throttle is intended to cause the vehicle to move. In the shared vehicle system, for example, such an operating state may be entered, for example, when a user runs the vehicle and/or when the vehicle is placed in maintenance mode.

Regardless of the trigger event that starts the controller executing method 300, the method may proceed to act 302. At act 302, the method may wait until actuation of a throttle is detected. A throttle, for example, may have a range of motion, spanning from no actuation to a full throttle position. The throttle may output a signal, which may serve as an input to the controller, that indicates opposition of the throttle within the range. Accordingly, act 302 may entail waiting to detect an output from the throttle greater than that corresponding to no actuation.

Regardless of the manner in which throttle actuation is detected, method 300 may proceed to act 304. At act 304, the controller may read the output of one or more sensors acting as a rider sensor. At act 306 the controller may read the output of a speed sensor.

At act 308, the controller may compute a torque corresponding to the detected throttle position. The torque may be applied by the motor such as to propel the vehicle at a speed related to the throttle position. As an example, a PID control approach may be used, such that when the throttle output indicates that the throttle has been moved further towards the full throttle position, the computed torque increases. Conversely, when the throttle output indicates that the throttle has been moved closer to its no actuation position, the computed torque decreases. As another example, the controller may compute from the output of the throttle a position of the throttle as a percentage of full throttle. The controller may then compute a torque as the same percentage as the maximum torque that may be delivered by the motor.

It should be appreciated, however, that other approaches for computing torque alternatively or additionally may be used. Moreover, it should be appreciated that torque is used in FIG. 3 as an example of a controlled variable. Other parameters of motor operation may alternatively be controlled. For example, motor speed or the magnitude of the motor control signal may be the controlled variable instead of, or in addition to, torque.

Once the value of the controlled variable is determined, method 300 proceeds to decision block 310. At decision block 310, method 300 branches, depending on whether a rider has been detected on the vehicle. If so, processing proceeds to act 320, which here represents the beginning of processing in riding mode. In riding mode, the controller may limit the speed of the vehicle to a speed suitable for riding on a road, such as greater than 15 miles per hour. That limit may be applied by determining that the torque computed at act 308 is likely to result in a speed above the limit and then limiting the magnitude of the torque called for by the control signal sent to the motor. Such a determination may be made by a calculation, relating torque to motor speed for any given loading conditions. Alternatively or additionally, the determination of whether to limit torque may be made empirically, such as based on the speed sensed at act 306. If the speed sensed at act 306 is at or above the limit, for example, the torque may be limited.

In this example, act 320 is shown as optional in method 300 because affirmative processing to limit speed may not be performed in all embodiments. The limit, for example, may arise from physical limits of the motor or other parameters of operation. Regardless of how the speed is limited, however, the vehicle may be designed such that the maximum speed is greater than the speed at which an average person walks or the slowest speed at which people in the population of riders walk.

Regardless of whether the magnitude of the computed torque is expressly limited at act 320, method 300 may proceed to act 334 where the computed torque, optionally as limited in act 320, may be used to generate motor control signals. Those motor control signals may cause the motor to output torque proportional to the computed value. In this way, the motor will be controlled to propel the vehicle with a torque that delivers a speed dependent on the throttle position.

Method 300 is shown looping back to act 302, indicating that the controller may implement method 300 as a feedback loop, dynamically responding to the throttle position. In each pass through the loop, the throttle position may be sensed at act 302 and the speed may be sensed at act 306, such that an appropriate torque may be computed at act 308.

In each pass through the loop, the controller may check sensor inputs at act 304 to determine whether the vehicle should stay in riding mode. If, in any pass through the loop, a sensor output indicates that no rider is mounted on the vehicle, processing may branch at decision block 310 to decision block 330. This branch may begin a walk-assist mode.

In walk-assist mode, at decision block 330, the process may branch depending on whether the sensed speed of the vehicle is above a limit for walk-assist mode. That limit may be set based on the speed at which people in the intended population of users can walk, such as less than 5 miles per hour.

If so, method 300 may branch to act 332, where the computed torque is limited. Processing at act 332 may be similar to the processing described above for act 320. However, the limit applied in walk-assist mode act 332 may be lower than the limit applied in riding mode at act 320.

Conversely, if the speed is not above the limit for walk-assist mode, act 332 may be bypassed. Regardless of whether the computed torque is limited, method 300 may proceed to act 334. As described above, at act 334, the computed torque, as limited, may be used to generate motor control signals. Though motor control signals are generated at act 334 in both riding mode and walk-assist mode, those control signals may be different for the same amount of motion of the throttle between the two modes. Faster speeds may result for the same amount of throttle actuation in riding mode compared to walk-assist mode.

It should be appreciated that FIG. 3 is an example of operations that may be performed in controlling a vehicle to implement a riding mode and a walk-assist mode. Both the specific operations and their order is for illustration and not limitation. For example, in some embodiments, the ordering of the steps may result a riding mode and a walk-assist mode in which a motor control signal controls the motor to produce a same speed related to throttle position for speeds up to the predetermined speed limit set for walk assist mode. In other embodiments, however, in the walk-assist mode, the motor control signal may control the motor to produce the predetermined speed limit when the throttle is in the full throttle position, with proportionately slower speeds for each throttle position in the range such that, for each throttle position the speed is slower in the walk-assist mode than in the riding mode. As an example of another variation, the speed might not be sensed at all. Rather, in some embodiments, speed might not be limited in riding mode. In walk-assist mode, torque might be limited to be less than a predetermined maximum without sensing the speed of the vehicle.

As another example, rather than computing torque based on throttle position before determining whether the vehicle is operating in riding mode or walk-assist mode at decision block 310, torque may be computed after determining at decision block 310 whether the vehicle is operating in riding mode or walk-assist mode. In such an embodiment, the computation of torque may be different depending on operating mode. In each case, the torque might be computed proportional to throttle position, with the proportionality set to deliver a torque corresponding to a full throttle position that is higher in riding mode than in walk-assist mode.

Figure 4:
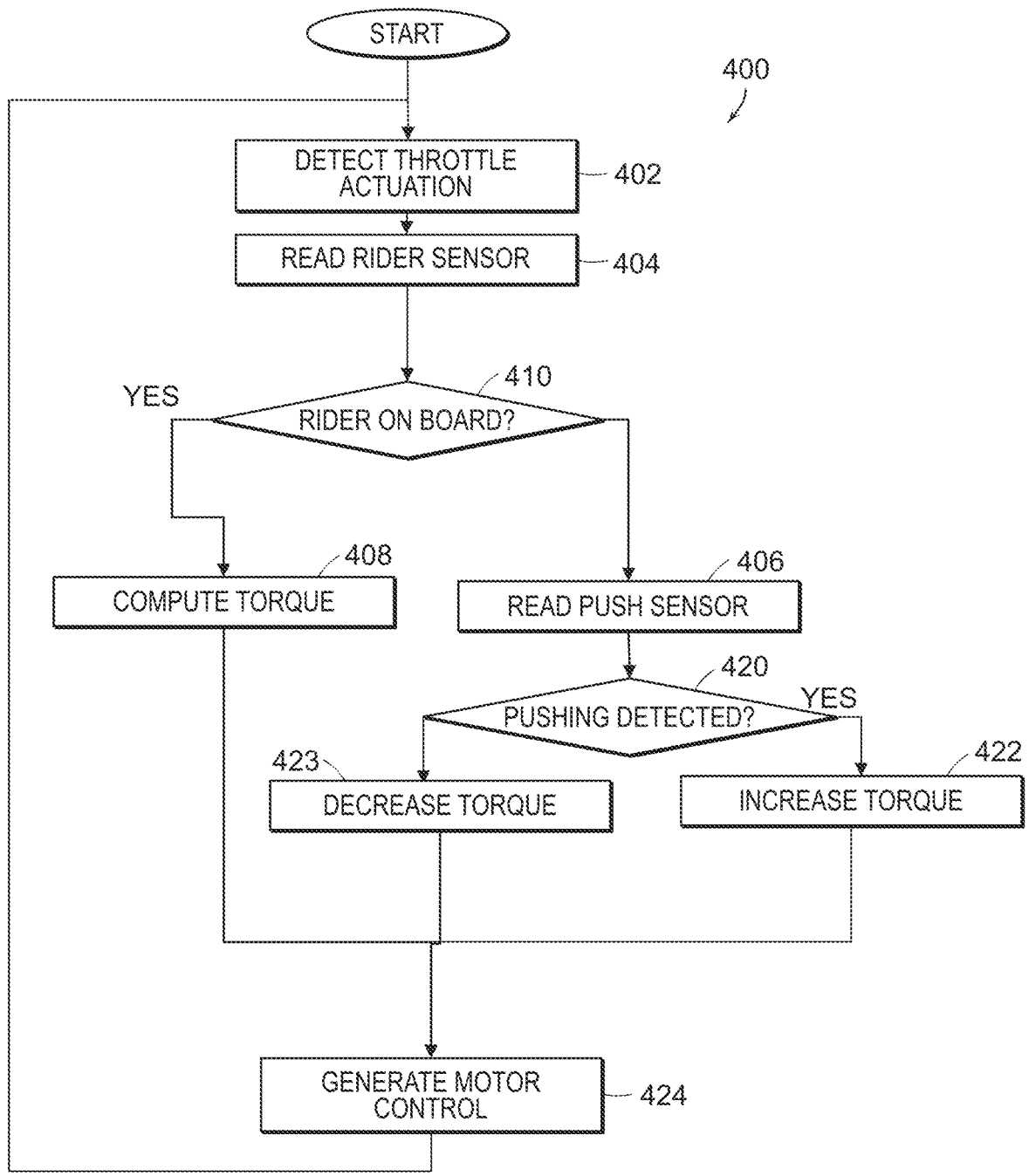
FIG. 4 is a flowchart of an alternative method of operating a controller for an electric vehicle, in accordance with some illustrative embodiments.

FIG. 4 provides another example of a control algorithm that has a riding mode and a walk-assist mode. As with method 300, method 400 may start when the vehicle is turned on or in response to another trigger condition.

Similarly, method 400 may include acts at which the controller obtains inputs from one or more sensors. At act 402, the controller may detect actuation of the throttle. At act 404, the controller may detect whether a rider is mounted on the vehicle. A rider may be detected as described above in connection with act 304.

At decision block 410, method 400 may branch based on whether a rider is detected mounted on the vehicle or, conversely, whether the user is detected pushing the vehicle. When a rider is detected, method 400 may branch to act 408. At act 408, the controller may compute a torque based on the throttle actuation detected at act 402. Computation of torque at act 408 may be performed using techniques as described above in connection with act 308.

The computed torque may then be used to generate motor control signals at act 424. Motor control signals may be generated using techniques as described above in connection with act 334. In the example of FIG. 4, the torque commanded by the generated motor control signal is not shown to be affirmatively limited by speed. However, it should be appreciated that operations as described above in connection with act 320 may be implemented as part of the riding mode portion of method 400.

When no rider is detected on board, method 400 may branch from decision block 410 to act 406 where walk-assist mode begins. In method 400, walk-assist mode is implemented by setting motor torque to offset, in whole or in part, the force required for a user to push the vehicle. At act 406, the controller may obtain the output of one or more sensors that detect that pushing force. The force sensors read in act 406 may be mounted in a location at which a user pushing the vehicle would grasp the vehicle. In some embodiments, the sensors may be mounted on one or both handlebars of the vehicle.

At decision block 420 and acts 422 and 423, the controller may determine a torque for the motor of the vehicle to generate so that the motor, rather than pushing force from the user, will propel in whole or in part the vehicle. In this example, method 400 may branch based on whether a pushing force is detected. If so, the method may branch to act 422, where the torque to be generated by the motor is increased. Conversely, if no pushing force is detected, method 400 may branch to act 423, where the controller may decrease the torque. As a result, in the illustrated embodiment, when no pushing force is detected, the vehicle might slow down as a result of motor torque being reduced.

Regardless of whether the torque is increased or decreased, method 400 may continue to act 424 where the computed torque may be used to generate a motor control signal. Method 400 may then loop back to act 402, implementing a control loop that adjusts the motor control signal to control the motor in a riding mode or a walk-assist mode. In this example, the user may use the throttle to increase or decrease the speed of the vehicle in riding mode, but may also use the throttle to indicate walk-assistance is desired while pushing.

Figure 5:
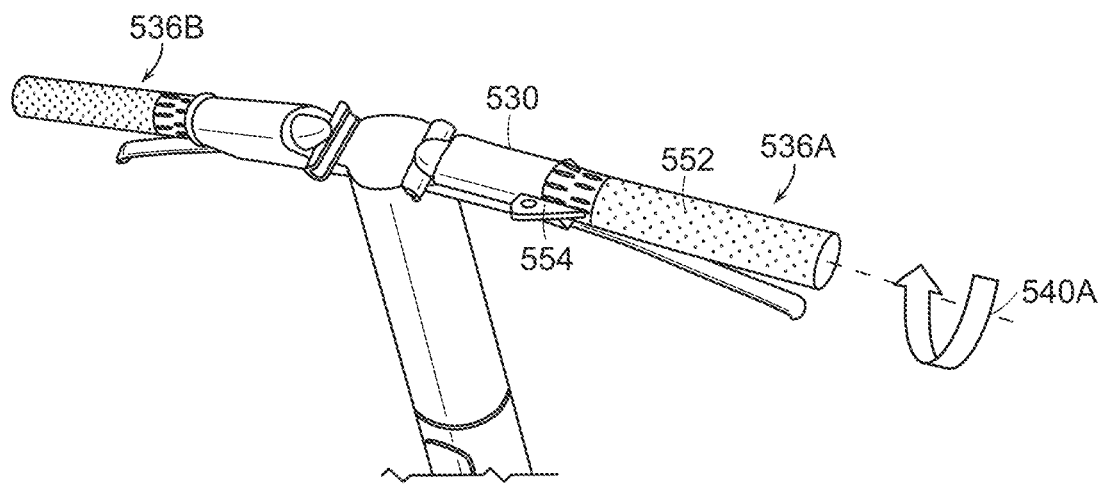
FIG. 5 is this perspective view of handlebars of an electrical vehicle, including a throttle according to some illustrative embodiments.

The throttle may be designed for ease and comfort of use in either or both of these modes. FIG. 5 is an exemplary embodiment of an upper portion of a stem of an electric vehicle, where one or more throttles may be located. The vehicle, for example, may be a micromobility vehicle as illustrated in FIGS. 1A-1E and FIG. 2.

Here handlebars 530 are shown. Throttles 536A and 536B are shown mounted on each handle bar. In this example, the throttles 536A and 536B are redundant. Each is coupled to the controller, and the user may use either to control the speed of the vehicle. However, it should be appreciated that a vehicle may be made with a single throttle, such as throttle 536A.

In this example, each of the throttles 536A and 536B has a tubular portion, of which tubular portion 552 is numbered. The throttle may be actuated by rotating the tubular portion around an axis of the handlebar to which the throttle is mounted. For example, throttle 536A may be activated by rotating its tubular portion around axis 540A, as illustrated. The throttle may be spring biased to return to an un-actuated position when released by the user. The throttle may rotate a maximum amount, such as 90 degrees, into a full throttle position, defining a range of motion for the throttle. Such a throttle may be actuated by a user grasping the throttle with their hand and twisting the throttle.

In some embodiments, a throttle may include a tab, such as tab 554. The tab may be positioned for a user to press the tab with their thumb.

Figure 6:
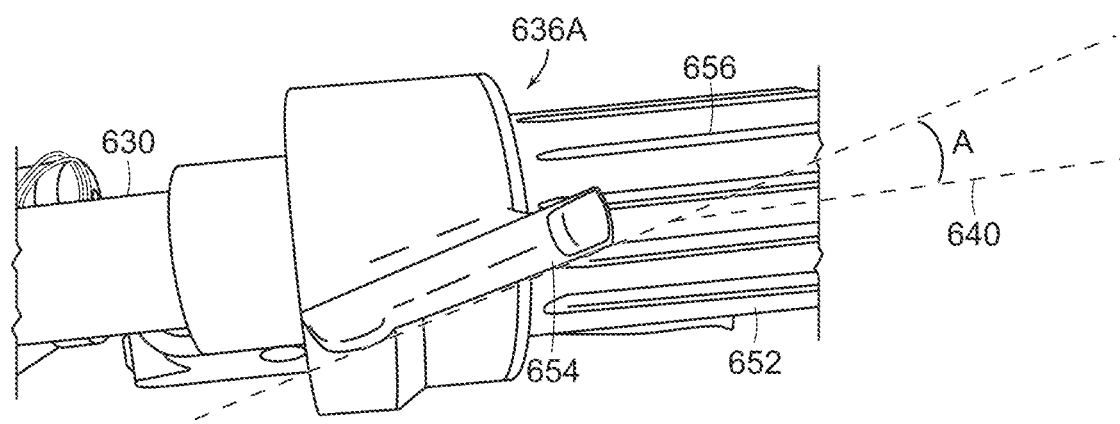
FIG. 6 is a perspective view of a portion of a throttle according to some illustrative embodiments.

FIG. 6 illustrates a throttle 636A that includes a tubular portion 652 and a tab 654. Tubular portion 652 encircles handlebar 630 and rotates around axis 640 of the handlebar. In this example, tubular portion 652 includes surface features, here shown as ridges 656, that may facilitate a user grasping and twisting the tubular portion to actuate the throttle. Tab 654 extends radially outwards with respect to the axis 640 and the tubular portion 652.

In this example, tubular portion 652 and tab 654 are coupled, such that a user may press the tab or rotate the tubular portion to actuate the throttle. A user, for example, may opt to rotate tubular portion 652 by twisting their wrist while in riding mode, but may find it more convenient or more comfortable to press on tab 654 while in walk-assist mode.

In the example of FIG. 6, tab 654 may be angled so as to be more comfortable for a user. In this example, a surface of tab 654 is angled at an angle A with respect to the axis 640. The angle A may be between 5 and 45 degrees.

Figure 7:
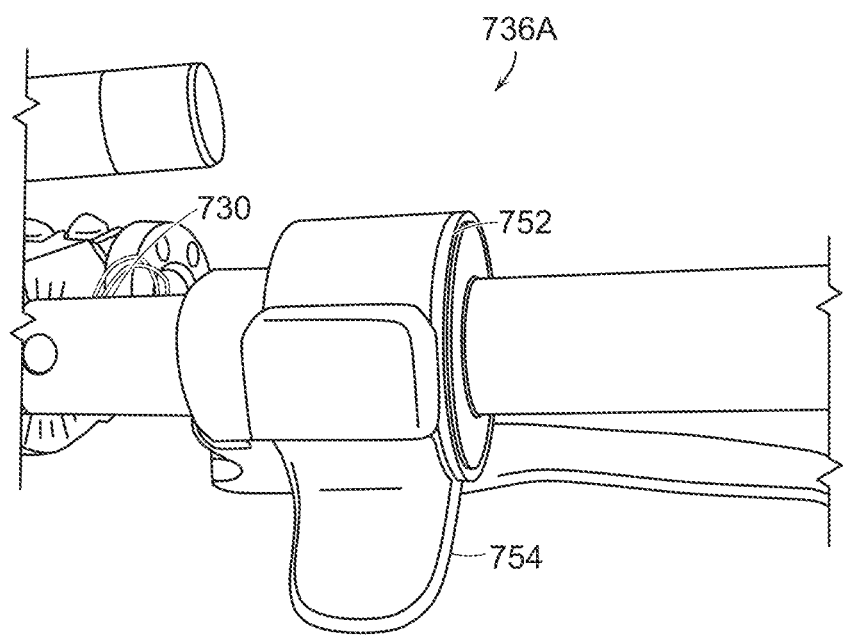
FIG. 7 is a perspective view of a throttle according to some illustrative embodiments.

FIG. 7 shows another embodiment of a throttle 736A with a tab 754 that a user may press with their thumb. In this example, the surface of the tab is not angled with respect to the axis of handlebar 730, but the surface may be concave so as the readily receive a user's thumb.

The throttle of FIG. 7 here includes a tubular portion 752 that may rotate around handlebar 730. Tab 754 extends radially outwards from tubular portion 752 such that tubular portion 752 may rotate when tab 754 is pressed. In this example, tubular portion 752 is long enough to support tab 754. However, tubular portion 752 has an axial length that is approximately the same as tab 754, and may not be readily grasped by a user riding a vehicle as a way to actuate throttle 736A.

A micromobility vehicle with a throttle having a tab as illustrated in FIG. 7 may additionally include a throttle with a second tubular portion that is long enough and positioned so that a user may grasp it while riding. The second tubular portion, for example, may be configured like tubular portion 652. In such an embodiment, the tab and the second tubular portion may be operated independently. In some embodiments, the tab and second tubular portion may provide alternative ways for a user to generate a throttle signal to a controller. In other embodiments, the tab and second tubular portion may provide different functions. Actuation of the tab, for example, may signal that the user wants to use walk-assist mode and speed, though limited to a relatively low speed such as less than 5 miles per hour, may be set based on actuation of the tab throttle. Rotation of the second tubular portion may generate a throttle signal that the controller uses to set the speed of the vehicle when in riding mode.

The tab and/or second tubular portion may be mounted on a vehicle in locations that facilitate operation. Either or both may be mounted on either the left or right handlebars, or on both handlebars. A tab, such as tab 754, may be mounted on the left handlebar and the second tubular portion may be mounted on the right handlebar.

Figure 8:
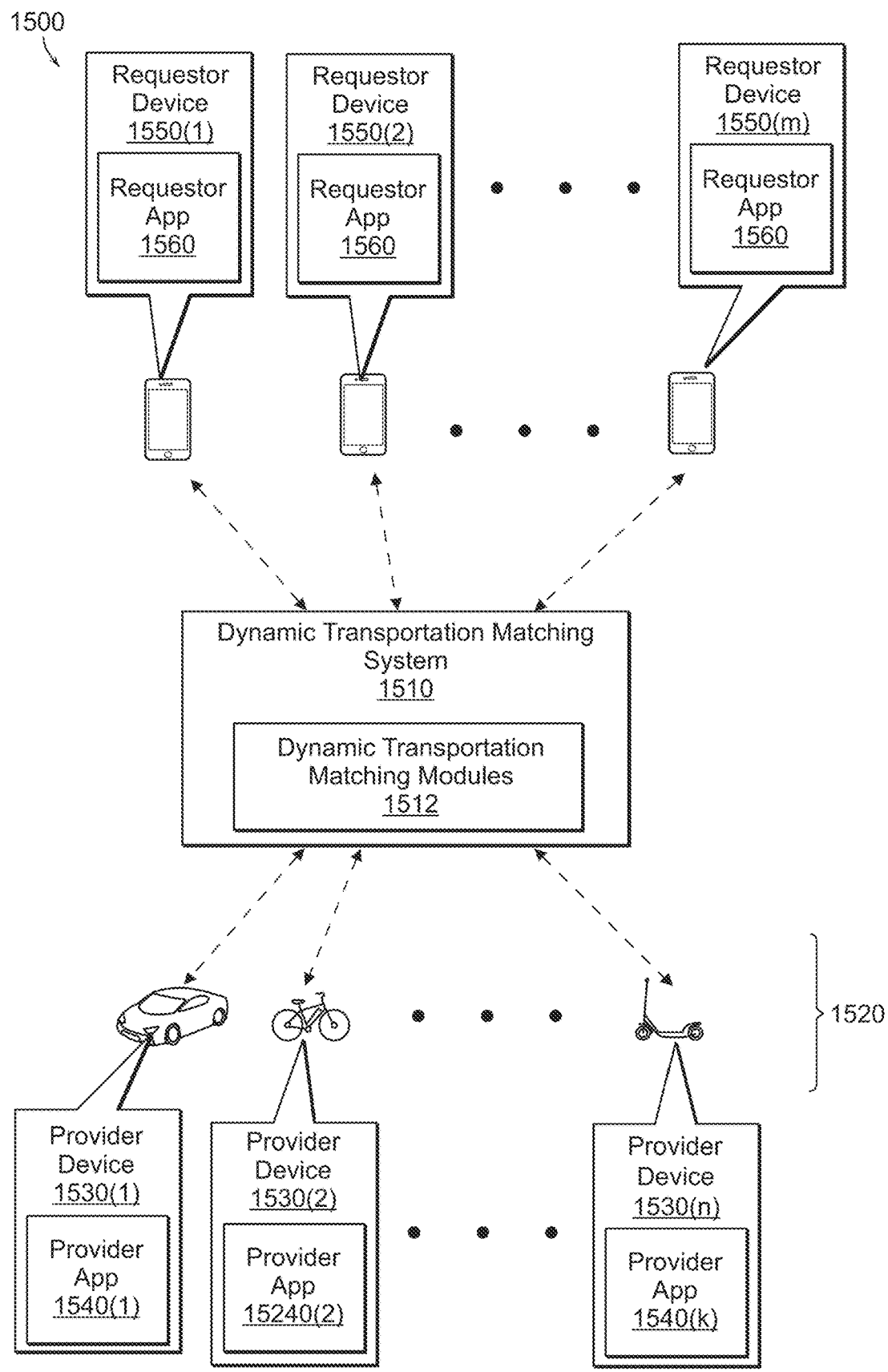
FIG. 8 illustrates an example system for matching transportation requests with a dynamic transportation network that includes personal mobility vehicles.

A micromobility vehicle as described herein may be made available through an on-demand, multimodal transportation system. FIG. 8 illustrates an example system 1500 for matching transportation requests with a dynamic transportation network that includes personal mobility vehicles. As shown in FIG. 8, a dynamic transportation matching system 1510 may be configured with one or more dynamic transportation matching modules 1512 that may perform one or more of the steps described herein. Dynamic transportation matching system 1510 may represent any computing system and/or set of computing systems capable of matching transportation requests. Dynamic transportation matching system 1510 may be in communication with computing devices in each of a group of vehicles 1520. Vehicles 1520 may represent any vehicles that may fulfill transportation requests. In some examples, vehicles 1520 may include disparate vehicle types and/or models. For example, vehicles 1520 may include road-going vehicles and personal mobility vehicles. In some examples, some of vehicles 1520 may be standard commercially available vehicles. According to some examples, some of vehicles 1520 may be owned by separate individuals (e.g., transportation providers). Furthermore, while, in some examples, many or all of vehicles 1520 may be human-operated, in some examples many of vehicles 1520 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requester, and/or an autonomous system for piloting a vehicle. While FIG. 8 does not specify the number of vehicles 1520, it may be readily appreciated that the systems described herein are applicable to hundreds of vehicles, thousands of vehicles, or more. In one example, dynamic transportation matching system 1510 may coordinate transportation matchings within a single region for 50,000 vehicles or more on a given day. In some examples, vehicles 1520 may collectively form a dynamic transportation network that may provide transportation supply on an on-demand basis to transportation requestors.

Dynamic transportation matching system 1510 may communicate with computing devices in each of vehicles 1520. The computing devices may be any suitable type of computing device. In some examples, one or more of the computing devices may be integrated into the respective vehicles 1520. In some examples, one or more of the computing devices may be mobile devices. For example, one or more of the computing devices may be smartphones. Additionally, or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requester and/or provider for a transportation matching application, a navigation application, and/or any other application suited for the use of requesters and/or providers). Additionally, or alternatively, one or more of the computing devices may be devices suitable for installing in a vehicle and/or may be a vehicle's computer that has a transportation management system application installed on the computer in order to provide transportation services to transportation requesters and/or communicate with dynamic transportation matching system 1510.

As shown in FIG. 8, vehicles 1520 may include provider devices 1530(1)-(n) (e.g., whether integrated into the vehicle, permanently affixed to the vehicle, temporarily affixed to the vehicle, worn by a driver of the vehicle, etc.). In some examples, provider devices 1530(1)-(*n*) may include a respective provider app 1540(1)-(*k*). Provider apps 1540(1)-(*k*) may represent any application, program, and/or module that may provide one or more services related to operating a vehicle and/or providing transportation matching services. For example, provider apps 1540(1)-(*k*) may include a transportation matching application for providers and/or one or more applications for matching personal mobility vehicles (PMVs) with requester devices. In some embodiments, different types of provider vehicles may be provisioned with different types of provider devices and/or different provider applications. For example, PMVs may be provisioned with provider devices that are configured with a provider application that enables transportation requesters to reserve and/or operate the PMV while road-constrained vehicles (e.g., cars) may be provisioned with provider devices that are configured with a provider application that enables provider vehicle operators (e.g., transportation providers) to respond to requests from transportation requesters. In some examples, provider applications 1540(1)-(*k*) may match the user of provider apps 1540(1)-(*k*) (e.g., a transportation provider) with transportation requesters through communication with dynamic transportation matching system 1510. In addition, and as is described in greater detail below, provider apps 1540(1)-(*k*) may provide dynamic transportation matching system 1510 with information about a provider (including, e.g., the current location of the provider and/or vehicle) to enable dynamic transportation matching system 1510 to provide dynamic transportation matching and/or management services for the provider and one or more requesters. In some examples, provider apps 1540(1)-(*k*) may coordinate communications and/or a payment between a requester and a provider. According to some embodiments, provider apps 1540(1)-(*k*) may provide a map service, a navigation service, a traffic notification service, and/or a geolocation service.

Additionally, as shown in FIG. 8, dynamic transportation matching system 1510 may communicate with requester devices 1550(1)-(*m*). In some examples, requester devices 1550(1)-(*m*) may include a requester app 1560. Requester app 1560 may represent any application, program, and/or module that may provide one or more services related to requesting transportation matching services. For example, requester app 1560 may include a transportation matching application for requesters. In some examples, requester app 1560 may match the user of requester app 1560 (e.g., a transportation requester) with transportation providers through communication with dynamic transportation matching system 1510. In addition, and as is described in greater detail below, requester app 1560 may provide dynamic transportation matching system 1510 with information about a requester (including, e.g., the current location of the requester) to enable dynamic transportation matching system 1510 to provide dynamic transportation matching services for the requester and one or more providers. In some examples, requester app 1560 may coordinate communications and/or a payment between a requester and a provider. According to some embodiments, requester app 1560 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requesters with one or more transportation providers. For example, a transportation matching system may provide one or more transportation matching services for a networked transportation service, a ride sourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requesters to ride opportunities and/or that arranges for requesters and/or providers to meet), a mapping system, a navigation system (e.g., to help a provider reach a requester, to help a requester reach a provider, and/or to help a provider reach a destination), a reputation system (e.g., to rate and/or gauge the trustworthiness of a requester and/or a provider), a payment system, and/or an autonomous or semi-autonomous driving system. The transportation matching system may be implemented on various platforms, including a requester-owned mobile device, a computing system installed in a vehicle, a requester-owned mobile device, a server computer system, or any other hardware platform capable of providing transportation matching services to one or more requesters and/or providers.

Figure 9:
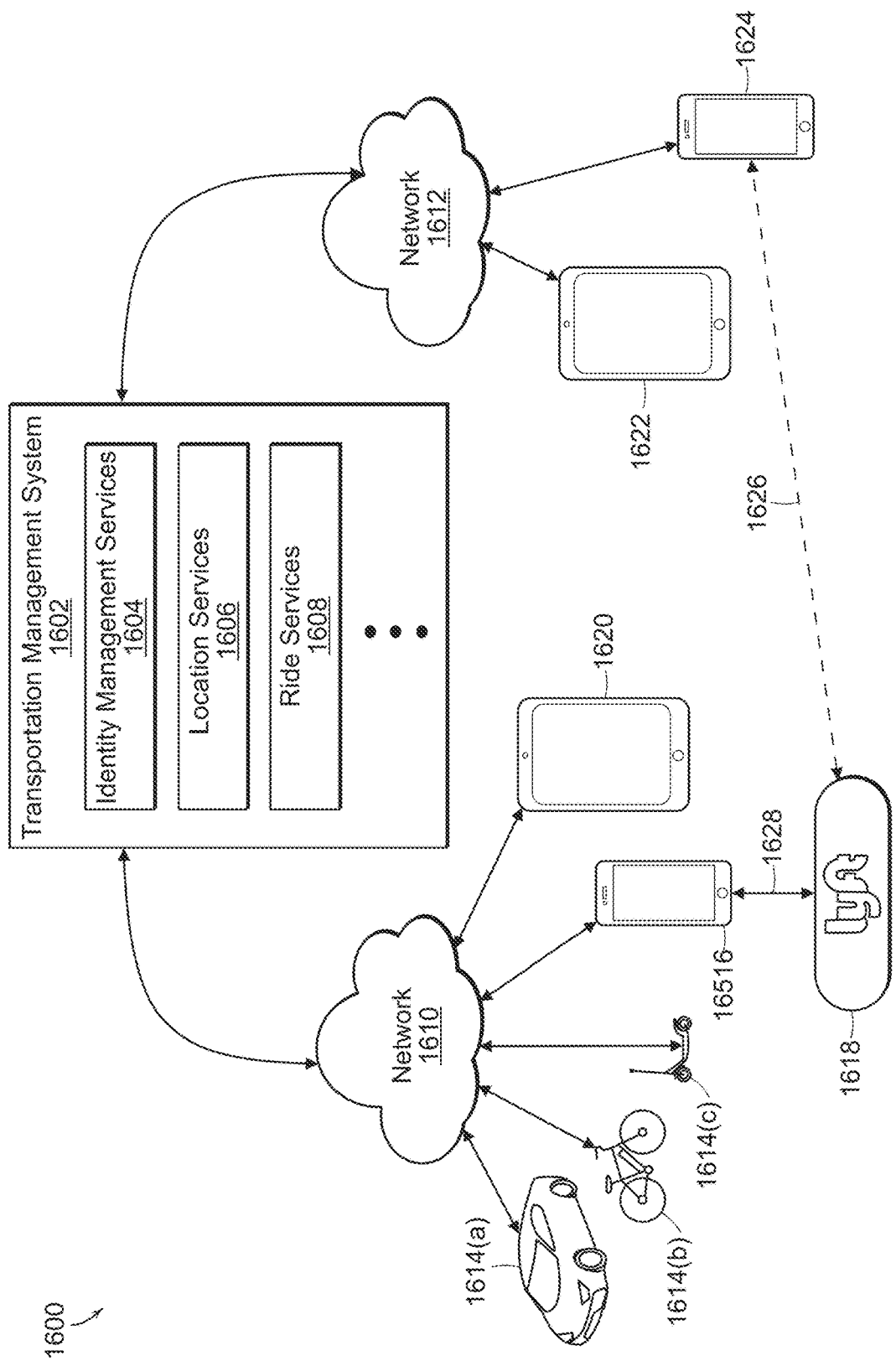
FIG. 9 shows a transportation management environment in accordance with various embodiments.

FIG. 9 shows a transportation management environment 1600, in accordance with various embodiments. As shown in FIG. 9, a transportation management system 1602 may run one or more services and/or software applications, including identity management services 1604, location services 1606, ride services 1608, and/or other services. Although FIG. 9 shows a certain number of services provided by transportation management system 1602, more or fewer services may be provided in various implementations. In addition, although FIG. 9 shows these services as being provided by transportation management system 1602, all or a portion of any of the services may be processed in a distributed fashion. For example, computations associated with a service task may be performed by a combination of transportation management system 1602 (including any number of servers, databases, etc.), one or more devices associated with a provider (e.g., devices integrated with managed vehicles 1614(*a*), 1614(*b*), and/or 1614(*c*); provider computing devices 1616 and tablets 1620; and transportation management vehicle devices 1618), and/or more or more devices associated with a ride requester (e.g., the requester's computing devices 1624 and tablets 1622). In some embodiments, transportation management system 1602 may include one or more general purpose computers, server computers, clustered computing systems, cloud-based computing systems, and/or any other computing systems or arrangements of computing systems. Transportation management system 1602 may be configured to run any or all of the services and/or software components described herein. In some embodiments, the transportation management system 1602 may include an appropriate operating system and/or various server applications, such as web servers capable of handling hypertext transport protocol (HTTP) requests, file transfer protocol (FTP) servers, database servers, etc.

In some embodiments, identity management services 1604 may be configured to perform authorization services for requesters and providers and/or manage their interactions and/or data with transportation management system 1602. This may include, e.g., authenticating the identity of providers and determining that they are authorized to provide services through transportation management system 1602. Similarly, requesters' identities may be authenticated to determine whether they are authorized to receive the requested services through transportation management system 1602. Identity management services 1604 may also manage and/or control access to provider and/or requester data maintained by transportation management system 1602, such as driving and/or ride histories, vehicle data, personal data, preferences, usage patterns as a ride provider and/or as a ride requester, profile pictures, linked third-party accounts (e.g., credentials for music and/or entertainment services, social-networking systems, calendar systems, task-management systems, etc.) and any other associated information. Transportation management system 1602 may also manage and/or control access to provider and/or requester data stored with and/or obtained from third-party systems. For example, a requester or provider may grant transportation management system 1602 access to a third-party email, calendar, or task management system (e.g., via the user's credentials). As another example, a requester or provider may grant, through a mobile device (e.g., 1616, 1620, 1622, or 1624), a transportation application associated with transportation management system 1602 access to data provided by other applications installed on the mobile device. In some examples, such data may be processed on the client and/or uploaded to transportation management system 1602 for processing.

In some embodiments, transportation management system 1602 may provide ride services 1608, which may include ride matching and/or management services to connect a requester to a provider. For example, after identity management services module 1604 has authenticated the identity a ride requester, ride services module 1608 may attempt to match the requester with one or more ride providers. In some embodiments, ride services module 1608 may identify an appropriate provider using location data obtained from location services module 1606. Ride services module 1608 may use the location data to identify providers who are geographically close to the requester (e.g., within a certain threshold distance or travel time) and/or who are otherwise a good match with the requester. Ride services module 1608 may implement matching algorithms that score providers based on, e.g., preferences of providers and requesters; vehicle features, amenities, condition, and/or status; providers' preferred general travel direction and/or route, range of travel, and/or availability; requesters' origination and destination locations, time constraints, and/or vehicle feature needs; and any other pertinent information for matching requesters with providers. In some embodiments, ride services module 1608 may use rule-based algorithms and/or machine-learning models for matching requesters and providers.

Transportation management system 1602 may communicatively connect to various devices through networks 1610 and/or 1612. Networks 1610 and 1612 may include any combination of interconnected networks configured to send and/or receive data communications using various communication protocols and transmission technologies. In some embodiments, networks 1610 and/or 1612 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1610 and/or 1612 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Bluetooth 5, Near Field Communication (NFC), Z-Wave, and ZigBee). In various embodiments, networks 1610 and/or 1612 may include any combination of networks described herein or any other type of network capable of facilitating communication across networks 1610 and/or 1612.

In some embodiments, transportation management vehicle device 1618 may include a provider communication device configured to communicate with users, such as drivers, passengers, pedestrians, and/or other users. In some embodiments, transportation management vehicle device 1618 may communicate directly with transportation management system 1602 or through another provider computing device, such as provider computing device 1616. In some embodiments, a requester computing device (e.g., device 1624) may communicate via a connection 1626 directly with transportation management vehicle device 1618 via a communication channel and/or connection, such as a peer-to-peer connection, Bluetooth connection, NFC connection, ad hoc wireless network, and/or any other communication channel or connection. Although FIG. 9 shows particular devices communicating with transportation management system 1602 over networks 1610 and 1612, in various embodiments, transportation management system 1602 may expose an interface, such as an application programming interface (API) or service provider interface (SPI) to enable various third parties which may serve as an intermediary between end users and transportation management system 1602.

In some embodiments, devices within a vehicle may be interconnected. For example, any combination of the following may be communicatively connected: vehicle 1614, provider computing device 1616, provider tablet 1620, transportation management vehicle device 1618, requester computing device 1624, requester tablet 1622, and any other device (e.g., smart watch, smart tags, etc.). For example, transportation management vehicle device 1618 may be communicatively connected to provider computing device 1616 and/or requester computing device 1624. Transportation management vehicle device 1318 may establish communicative connections, such as connections 1626 and 1628, to those devices via any suitable communication technology, including, e.g., WLAN technologies implementing the IEEE 902.12 family of standards, Bluetooth, Bluetooth Low Energy, Bluetooth 5, NFC, Z-Wave, ZigBee, and any other suitable short-range wireless communication technology.

In some embodiments, users may utilize and interface with one or more services provided by the transportation management system 1602 using applications executing on their respective computing devices (e.g., 1616, 1618, 1620, and/or a computing device integrated within vehicle 1614), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1614 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requester, including an application associated with transportation management system 1602. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 10:
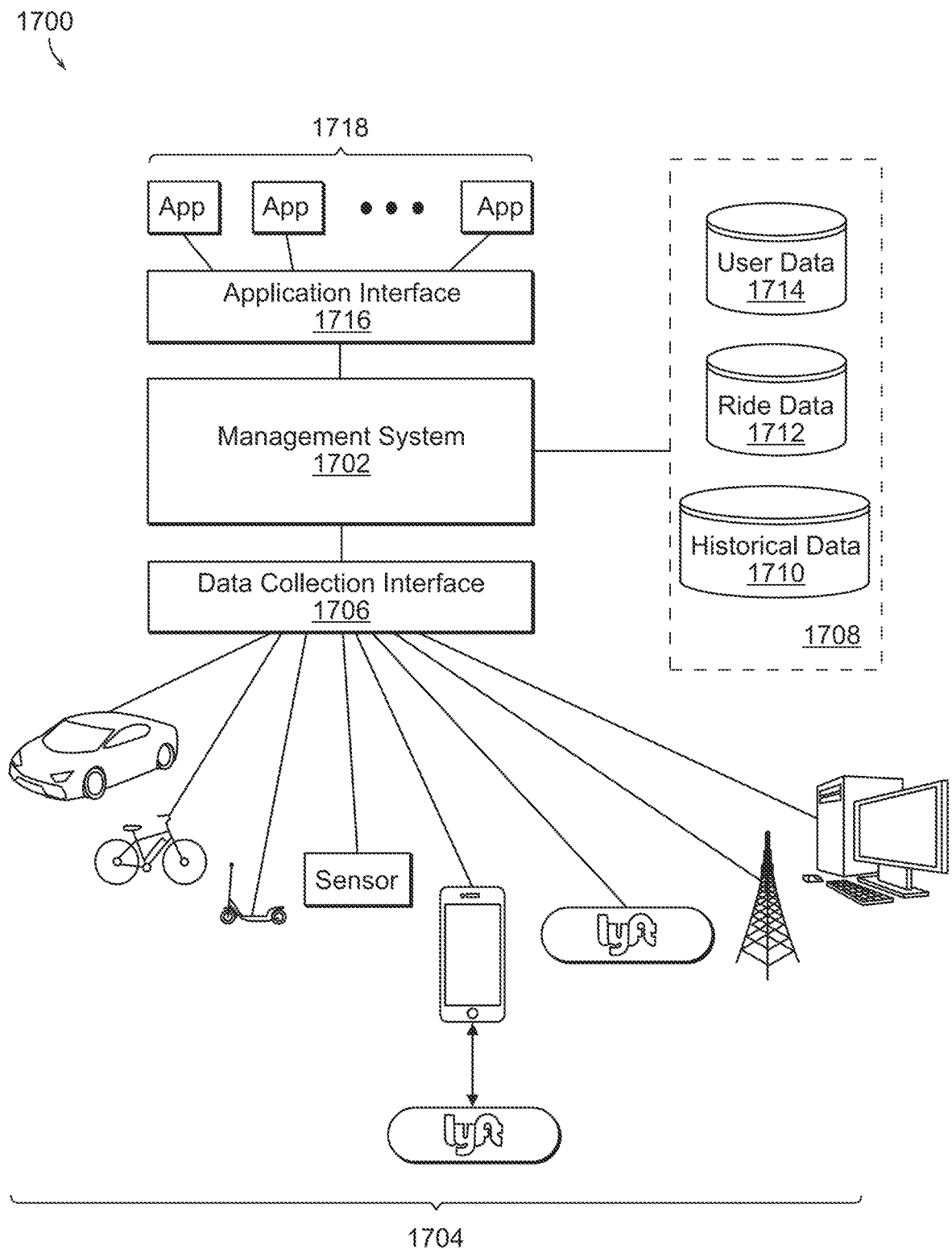
FIG. 10 shows a data collection and application management environment in accordance with various embodiments.

FIG. 10 shows a data collection and application management environment 1700, in accordance with various embodiments. As shown in FIG. 10, management system 1702 may be configured to collect data from various data collection devices 1704 through a data collection interface 1706. As discussed above, management system 1702 may include one or more computers and/or servers or any combination thereof. Data collection devices 1704 may include, but are not limited to, user devices (including provider and requester computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1706 can include, e.g., an extensible device framework configured to support interfaces for each data collection device. In various embodiments, data collection interface 1706 may be extended to support new data collection devices as they are released and/or to update existing interfaces to support changes to existing data collection devices. In various embodiments, data collection devices may communicate with data collection interface 1706 over one or more networks. The networks may include any network or communication protocol as would be recognized by one of ordinary skill in the art, including those networks discussed above.

As shown in FIG. 10, data received from data collection devices 1704 can be stored in data store 1708. Data store 1708 may include one or more data stores, such as databases, object storage systems and services, cloud-based storage services, and other data stores. For example, various data stores may be implemented on a non-transitory storage medium accessible to management system 1702, such as historical data store 1710, ride data store 1712, and user data store 1714. Data stores 1708 can be local to management system 1702, or remote and accessible over a network, such as those networks discussed above or a storage area network or other networked storage system. In various embodiments, historical data 1710 may include historical traffic data, weather data, request data, road condition data, or any other data for a given region or regions received from various data collection devices. Ride data store 1712 may include route data, request data, timing data, and other ride related data, in aggregate and/or by requester or provider. User data 1714 may include user account data, preferences, location history, and other user-specific data. Although certain data stores are shown by way of example, any data collected and/or stored according to the various embodiments described herein may be stored in data stores 1708.

As shown in FIG. 10, an application interface 1716 can be provided by management system 1702 to enable various apps 1718 to access data and/or services available through management system 1702. Apps 1718 may run on various user devices (including provider and requester computing devices, such as those discussed above) and/or may include cloud-based or other distributed apps configured to run across various devices (e.g., computers, servers, or combinations thereof). Apps 1718 may include, e.g., aggregation and/or reporting apps which may utilize data 1708 to provide various services (e.g., third-party ride request and management apps). In various embodiments, application interface 1716 can include an API and/or SPI enabling third party development of apps 1718. In some embodiments, application interface 1716 may include a web interface, enabling web-based access to data 1708 and/or services provided by management system 1702. In various embodiments, apps 1718 may run on devices configured to communicate with application interface 1716 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally, or alternatively, without limitation to transportation services, a matching system for any service may facilitate the fulfillment of requests using both human drivers and autonomous vehicles.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of an electric vehicle may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the motor driving a wheel of the vehicle, receiving and processing control signals from a central server, and/or displaying information to a user. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art.

For example, two modes, walk-assist mode and riding mode, were described above. A vehicle may be configured with other operating modes. For example, an inactive mode may be provided during which actuation of the throttle does not cause any control signals to be sent to the motor.

Walk-assist mode may be entered for reasons other than automatically based on detection of a rider. For example, the vehicle may operate in a maintenance mode or other limited functionality mode, such as when not rented to a user. In such a mode, riding mode may be disabled such that only walk-assist mode is available. The mode, in these scenarios, may be set by control signals sent to the vehicle, such as through a user interface wirelessly coupled to an on-board vehicle controller.

Walk-assist mode may be exited for reasons other than automatically based on detection of a rider. The on-board controller may be configured to exit walk-assist mode, for example, after a threshold amount of time or after the vehicle has been moved a threshold distance. Providing a walk-assist mode limited by duration or distance, for example, may be used in a shared vehicle system when a vehicle is not rented by a specific user but it may be desirable to enable a person to easily move the vehicle.

Further, control of one motor was described. Control techniques as described herein may be used with electric vehicles with any number of motors, such as two motors, one for a front wheel and one for a rear wheel.

Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A micromobility electric vehicle, comprising:
a throttle on a handlebar, the throttle configured to be moved to a throttle position in a range of throttle positions;
one or more sensors including a force sensor configured to detect a pushing force on the handlebar; and a controller operatively coupled to receive inputs from the throttle and the one or more sensors and to provide a motor control signal to a motor, wherein:

the controller is configured to generate the motor control signal based on inputs received from the throttle and the one or more sensors;

the controller is configured to selectively operate in a riding mode based on an input received from the one or more sensors indicating that a user is riding the micromobility electric vehicle and a walk-assist mode based on an input received from the one or more sensors indicating that the user is pushing the micromobility electric vehicle; and in the walk-assist mode, the controller is configured to provide the motor control signal so as to provide a speed that corresponds to the throttle position based on movement of the throttle on the handlebar and is lower than a speed in the riding mode for the same throttle position, and the controller is further configured to:

increase the speed corresponding to the throttle position when a magnitude of the pushing force in a forward direction of the micromobility electric vehicle detected by the force sensor is greater than a first threshold; and decrease the speed corresponding to the throttle position when a magnitude of the pushing force in a forward direction of the micromobility electric vehicle detected by the force sensor is less than a second threshold;

in the walk-assist mode, the controller is further configured to:

determine that a sensed speed of the micromobility electric vehicle exceeds a first predetermined maximum speed corresponding to the walk-assist mode;

calculate, in response to the determination that the sensed speed exceeds the first predetermined maximum speed, a maximum torque required to propel the micromobility electric vehicle at the first predetermined maximum speed under specified loading conditions; and provide the motor control signal such that an output torque is proportional to the calculated maximum torque, thereby delivering a speed corresponding to the throttle position.

2. The micromobility electric vehicle of claim 1, wherein:
in the walk-assist mode, the motor control signal is limited to provide a speed less than 4 miles per hour.

3. The micromobility electric vehicle of claim 1, wherein:
in the riding mode and the walk-assist mode, the motor control signal is configured to control the motor so as to produce a speed of the micromobility electric vehicle that corresponds to the throttle position over at least a portion of the range of throttle positions.

4. The micromobility electric vehicle of claim 3, wherein:
in the walk-assist mode, the motor control signal is configured to control the motor to produce a speed that corresponds to the throttle position for speeds below a predetermined speed limit.

5. The micromobility electric vehicle of claim 3, wherein:
in the walk-assist mode, the motor control signal is configured to control the motor to produce a predetermined speed limit when the throttle is at an end of the range of throttle positions.

6. The micromobility electric vehicle of claim 4, wherein:
in the walk-assist mode, a rear wheel of the micromobility electric vehicle is configured to position the micromobility electric vehicle in an upright storage position such that the rear wheel makes contact with a ground surface and a front wheel of the micromobility electric vehicle lifts off the ground surface.

7. The micromobility electric vehicle of claim 1, wherein:
the one or more sensors comprise a rider sensor.

8. The micromobility electric vehicle of claim 7, wherein:
the rider sensor comprises a tire pressure sensor;
the controller is further configured to retrieve a tire pressure reading from the tire pressure sensor; and
the micromobility electric vehicle is configured to operate in at least one of the riding mode and the walk-assist mode based at least on the tire pressure reading.

9. The micromobility electric vehicle of claim 7, wherein:
the micromobility electric vehicle further comprises a seat;
the rider sensor comprises a force sensor positioned to measure a force on the seat;
the controller is configured to retrieve the measured force; and
the micromobility electric vehicle is configured to operate in at least one of the walk-assist mode and riding mode based at least on the measured force.

10. The micromobility electric vehicle of claim 7, wherein:
the micromobility electric vehicle further comprises a footboard;
the rider sensor comprises a force sensor positioned to measure a force on the footboard;
the controller is configured to retrieve the measured force; and
the micromobility electric vehicle is configured to operate in at least one of the walk-assist mode and riding mode based at least on the measured force.

11. The micromobility electric vehicle of claim 1, wherein:
the throttle comprises a tubular portion encircling the handlebar and a tab coupled to the tubular portion and extending radially outward from the tubular portion;
the controller is configured to receive an input indicating a position of the tab; and
the micromobility electric vehicle is configured to operate in at least one of the walk-assist mode and riding mode based at least on the tab being actuated.

12. The micromobility electric vehicle of claim 1, wherein:
the throttle comprises a tubular portion encircling the handlebar;
the micromobility electric vehicle further comprises a tab configured to rotate around the handlebar;
the one or more sensors comprise a sensor that is configured to sense a rotation of the tab;
the controller is configured to receive an input indicating the sensed rotation of the tab; and
the micromobility electric vehicle is configured to operate in at least one of the walk-assist mode and riding mode based at least on the sensed rotation of the tab.

13. The micromobility electric vehicle of claim 1, wherein:
the micromobility electric vehicle further comprises the force sensor configured to detect a pushing force on the handlebar; and
in the walk-assist mode, the motor control signal is configured to provide a speed for the micromobility electric vehicle that reduces the pushing force detected with the force sensor.

14. The micromobility electric vehicle of claim 13, wherein:

in the riding mode, the motor control signal is configured to provide a second predetermined maximum speed when the throttle is at a maximum end of the range of throttle positions; and in the walk-assist mode, the motor control signal is configured to provide the speed for the micromobility electric vehicle that reduces the pushing force detected with the force sensor up to the first predetermined maximum speed.

15. The micromobility electric vehicle of claim 1, wherein:

the throttle comprises a tubular portion around the handlebar and a tab coupled to the tubular portion and extending radially outward from the tubular portion;

the tubular portion rotates around an axis of the handlebar; and the tab is oriented at an angle between 5 and 45 degrees with respect to the axis.

16. The micromobility electric vehicle of claim 1, wherein the one or more sensors comprise a force sensor configured to detect a pushing force of the user, wherein the speed in the walk-assist mode is related to the detected pushing force.

17. The micromobility electric vehicle of claim 16, wherein the walk-assist mode is activated based on movement of the throttle.

18. The micromobility electric vehicle of claim 1, wherein the throttle comprises:

a first tubular portion encircling the handlebar that is coupled with a tab extending radially outward from the first tubular portion such that the first tubular portion rotates when the tab is pressed; and a second tubular portion encircling the handlebar and positioned for the user to grasp while riding, wherein the controller is configured to:

provide the motor control signal based on actuation of the tab in the walk-assist mode; and provide the motor control signal based on a rotation of the second tubular portion in the riding mode.

19. A micromobility electric vehicle, comprising:

a handlebar;

a motor;

a throttle mounted to the handlebar and configured to be moved to a throttle position in a range of throttle positions, wherein the throttle comprises a tubular portion around the handlebar;

one or more sensors including a force sensor configured to detect a pushing force on the handlebar; and a controller operatively coupled to receive inputs from the throttle and the one or more sensors and configured to generate a control signal to the motor such that the motor propels the micromobility electric vehicle at a maximum speed greater than 10 miles per hour in a riding mode when the one or more sensors detect that a user is riding the micromobility electric vehicle and propels the micromobility electric vehicle at a maximum speed limited to less than 5 miles per hour in a walk-assist mode when the one or more sensors detect that the user is pushing the micromobility electric vehicle, wherein a speed in the walk-assist mode corresponds to the throttle position based on movement of the throttle on the handlebar and is lower than a speed in the riding mode for the same throttle position, and the controller, in the walk-assist mode, is further configured to:

increase the speed corresponding to the throttle position when a magnitude of the pushing force in a forward direction of the micromobility electric vehicle detected by the force sensor is greater than a first threshold; and decrease the speed corresponding to the throttle position when a magnitude of the pushing force in a forward direction of the micromobility electric vehicle detected by the force sensor is less than a second threshold;

in the walk-assist mode, the controller is further configured to:

determine that a sensed speed of the micromobility electric vehicle exceeds a first predetermined maximum speed corresponding to the walk-assist mode;

calculate, in response to the determination that the sensed speed exceeds the first predetermined maximum speed, a maximum torque required to propel the micromobility electric vehicle at the first predetermined maximum speed under specified loading conditions; and provide the motor control signal such that an output torque is proportional to the calculated maximum torque, thereby delivering a speed corresponding to the throttle position.

\* \* \* \* \*